(12) United States Patent
Czymontek

(10) Patent No.: US 8,239,840 B1
(45) Date of Patent: Aug. 7, 2012

(54) SENSOR SIMULATION FOR MOBILE DEVICE APPLICATIONS

(75) Inventor: Herbert Czymontek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,413

(22) Filed: Sep. 30, 2011

Related U.S. Application Data

(63) Continuation of application No. 12/882,844, filed on Sep. 15, 2010.

(60) Provisional application No. 61/312,445, filed on Mar. 10, 2010.

(51) Int. Cl.
G06F 9/44 (2006.01)
(52) U.S. Cl. ........................ 717/135; 717/125
(58) Field of Classification Search .................. 717/125, 717/135
See application file for complete search history.

(56) References Cited

U.S. PATENT DOCUMENTS

| | | | |
|---|---|---|---|
| 7,593,980 B2 | 9/2009 | Marascio et al. | |
| 7,627,425 B2* | 12/2009 | Salmre et al. | 701/208 |
| 8,037,406 B1 | 10/2011 | Barnes et al. | |
| 2002/0184610 A1 | 12/2002 | Chong et al. | |
| 2003/0192029 A1 | 10/2003 | Hughes | |
| 2003/0208748 A1 | 11/2003 | Levin et al. | |
| 2004/0015961 A1 | 1/2004 | Chefalas et al. | |
| 2004/0093595 A1 | 5/2004 | Bilange | |
| 2004/0261055 A1 | 12/2004 | Bertelrud et al. | |
| 2006/0073821 A1* | 4/2006 | Rantapuska | 455/423 |
| 2006/0242598 A1 | 10/2006 | Marascio et al. | |
| 2009/0213083 A1* | 8/2009 | Dicker et al. | 345/173 |
| 2009/0228862 A1 | 9/2009 | Bertelrud et al. | |
| 2010/0241857 A1 | 9/2010 | Okude et al. | |
| 2010/0251231 A1 | 9/2010 | Coussemaeker et al. | |

FOREIGN PATENT DOCUMENTS

JP 2007219719 8/2007

OTHER PUBLICATIONS

OpenIntents.org, "Sensor simulator description", Nov. 3, 2008, http://web.archive.org/web/20081103114910/http://www.openintents.org/en/node/23.*
"Google Sites", Google Sites—Wikipedia, the free encyclopedia [online], [retrieved Jun. 8, 2010]. Retrieved from the Internet: http://en.wikipedia.org/wiki/Google_Sites, 4 pages.
Scratch | Home | imagine, program, share [online], [retrieved Jun. 8, 2010]. Retrieved from the Internet: http://scratch.mit.edu/, 2 pages.

(Continued)

*Primary Examiner* — Wei Zhen
*Assistant Examiner* — Lanny Ung
(74) *Attorney, Agent, or Firm* — Young Basile Hanlon & MacFarlane P.C.

(57) ABSTRACT

Methods, systems, and apparatus, including computer programs encoded on computer storage media, for creating mobile device applications using a visual programming integrated development environment (IDE). In one aspect, a method includes receiving a user input entered through a visual programming interface of a visual programming IDE, advancing a mobile device application that is under development in the visual programming IDE to a state in which one or more sensor events that are associated with the user input are assumed to have been received, and outputting a mock-up of the mobile device application in the advanced state, through the visual programming interface.

16 Claims, 13 Drawing Sheets

OTHER PUBLICATIONS

"Adobe Dreamweaver C55," what is Dreamweaver | Adobe Dreamweaver CS5 [online], [retrieved Jun. 8, 2010]. Retrieved from the Internet: http://www.adobe.com/products/dreamweaver/, 5 pages.

"What is Alice?," Alice.org [online], [retrieved Jun. 8, 2010]. Retrieved from the Internet: http://www.alice.org/index.php?page=what_is_alice/what_is_alice, 2 pages.

Perez, "The Scannable World: Mobile Phones As Barcode Scanners" Sep. 24, 2008, <http://www.readwriteweb.com/archives/the_scannable_world_mobile_phones_as_barcode_scanners.php>.

Perez, "The Scannable World, Part 2: Scanning Your Web Printouts" Sep. 25, 2008, <http://www.readwriteweb.com/archives/the_scannable_world_part_2_scan_web_printouts.php>.

Perez, "The Scannable World, Part 3: Barcode Scanning in the Real World" Sep. 26, 2008, <http://www.readwriteweb.com/archives/the_scannable_world_barcodes_scanning_in_the_real_world.php>.

"Camera Phone Based Barcode Scanning", Sep. 9, 2008, White paper, CTIA Code Scan Action Team, online at <http://files.ctia.org/pdflWhitePaper_CTIA_WIC_CodeScan_9_08.pdf>.

Office Action dated Dec. 20, 2011 for U.S. Appl. No. 13/249,644. 24 pages.

Office Action dated Dec. 20, 2011 for U.S. Appl. No. 13/795,976. 30 pages.

* cited by examiner

SENSOR SIMULATION FOR MOBILE DEVICE APPLICATIONS

CROSS-REFERENCE TO RELATED APPLICATION

This patent application is a continuation (and claims the benefit of priority under 35 U.S.C. §120) of U.S. patent application Ser. No. 12/882,844, filed on Sep. 15, 2010, which claims the benefit to U.S. Patent Application No. 61/312,445, filed Mar. 10, 2010. Both of these prior applications are incorporated herein by reference in their entirety.

BACKGROUND

This specification relates to mobile devices and, in one particular implementation, to simulating sensor events through a visual programming integrated development environment ("IDE") that is used for developing mobile device applications.

Visual programming interfaces may be used to help novice computer users develop software applications. For instance, Adobe Dreamweaver by Adobe Systems of San Jose, Calif., and Google Sites by Google of Mountain View, Calif., provide visual programming interfaces that allow users to develop web pages without directly manipulating the underlying HyperText Markup Language ("HTML") code.

Other interfaces have been used to teach users the fundamentals of software development. Scratch, a project developed by the Massachusetts Institute of Technology, allows children to develop simple games, animated stories, music, and digital art using a block-based, visual programming language. Alice, a project developed by the Carnegie Melon University, uses a drag-and-drop visual programming interface to introduce basic programming language concepts.

SUMMARY

According to one innovative aspect of the subject matter described by this specification, a user may use a visual programming interface provided by a visual programming IDE to develop applications for personal electronic devices, such as mobile phones, personal digital assistants (PDAs), smartphones, tablet computers, e-book readers, notebook computers, or video gaming systems. The user may interact with the visual programming IDE on a device that does not include mobile device-specific functionality, such as a desktop computer that does not have an accelerometer and can therefore not generate accelerometer sensor events.

The visual programming IDE allows the user to troubleshoot the full functionality of the mobile device applications by simulating the occurrence of certain sensor events. For example, to test functionality of an application that may rely on accelerometer sensor or orientation sensor inputs, the user may select a "simulate shaking" button or may scroll an image of a virtual, on-screen compass, respectively, to simulate the effect that corresponding sensor events would have on the application. The user may monitor the effect of these events and may fine tune the application accordingly, without requiring the mobile device application to actually be deployed on a mobile device, thereby providing reliable, deterministic and reproducible testing of an application.

Another innovative aspect of the subject matter described in this specification may be embodied in methods that include the actions of receiving a user input entered through a visual programming interface of a visual programming IDE, advancing a mobile device application that is under development in the visual programming IDE to a state in which one or more sensor events that are associated with the user input are assumed to have been received, and outputting a mock-up of the mobile device application in the advanced state, through the visual programming interface.

Other embodiments of these aspects include corresponding systems, apparatus, and computer programs, configured to perform the actions of the methods, encoded on computer storage devices.

These and other embodiments may each optionally include one or more of the following features. For instance, visual programming interface is displayed on a client device that does not include a sensor which is capable of actually generating one or more of the sensor events; advancing the mobile device application further includes bypassing a portion of the mobile device application which tests whether the sensor events have been received; the mock-up of the mobile device application is displayed in a preview pane of the visual programming interface; one or more of the sensor events is an accelerometer sensor event, and the mobile device application is advanced to a state in which a mobile device upon which the mobile device application is being invoked is assumed to have been shaken; one or more of the sensor events is a telephony sensor event, and the mobile device application is advanced to a state in which a mobile device upon which the mobile device application is being invoked is assumed to have made or received a telephone call, or to have made or received a particular telephone call; one or more of the sensor events is a directional sensor event, and the mobile device application is advanced to a state in which a mobile device upon which the mobile device application is being invoked is assumed to be oriented in a particular direction; one or more of the sensor events is a text messaging sensor event, and the mobile device application is advanced to a state in which a mobile device upon which the mobile device application is being invoked is assumed to have sent or received a text message, or to have sent or received a particular text message; one or more of the sensor events is a location sensor event, and the mobile device application is advanced to a state in which a mobile device upon which the mobile device application is being invoked is assumed to be located in a particular location; receiving a user input further includes receiving a user selection of a point on a map displayed on the visual programming interface; the mobile device application is advanced to a state in which a sensor event having a user-specified particular type and magnitude is assumed to have been received; the visual programming IDE is a server-based visual programming IDE; the actions include altering code associated with the mobile device application to replace a sender that triggers an event based on sensor data, with a sender that triggers the event based on the user input; the mobile device application is advanced to a state in which two or more sensor events are assumed to have been simultaneously received; and/or advancing a mobile device application further includes advancing a mobile device application that is under development in the visual programming IDE to a state in which one or more sensor events that are associated with the user input are assumed to have been received and considered satisfactory by a sender.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
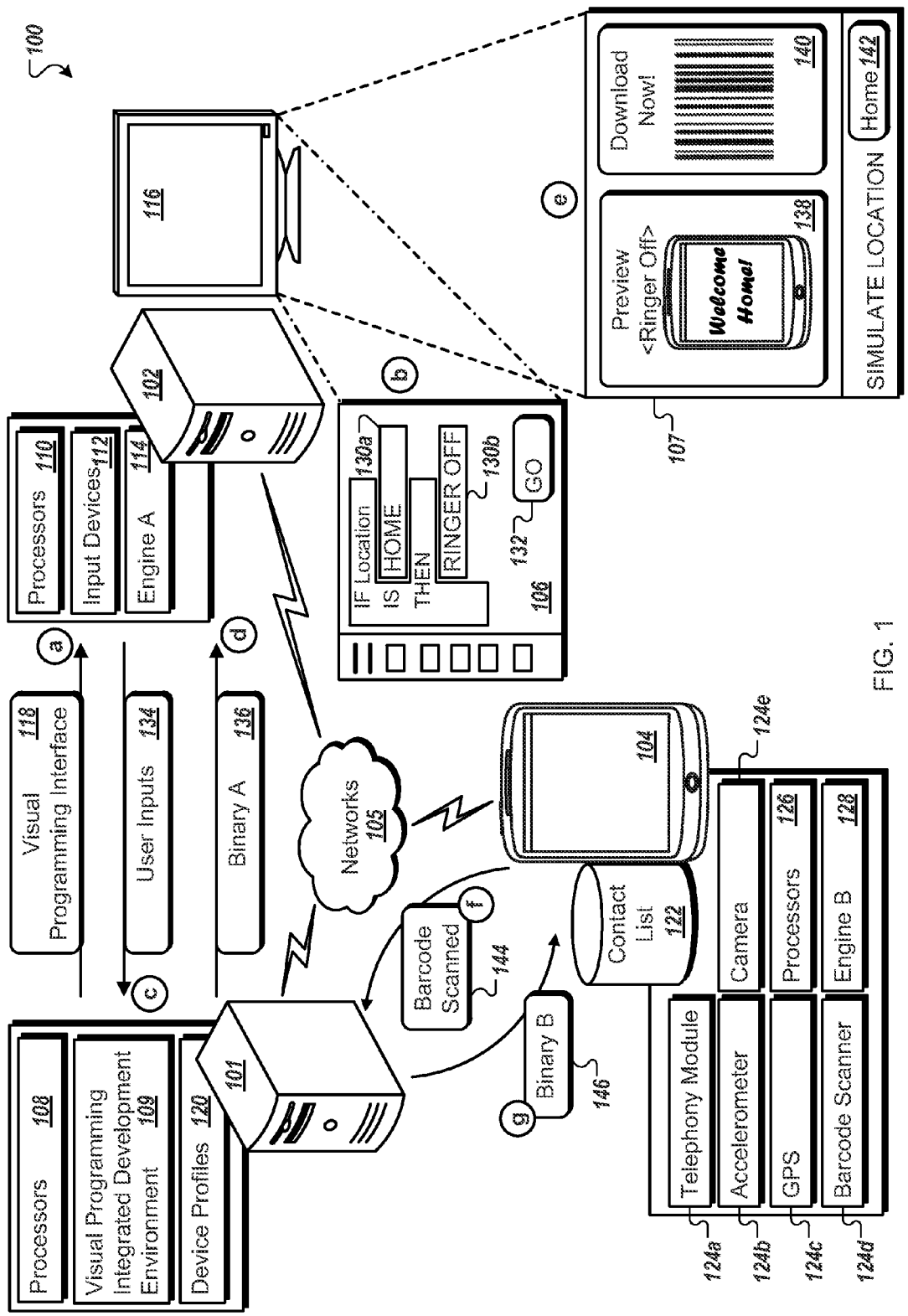
FIGS. 1 and 4 are diagrams of example systems that may be used for developing mobile device applications.

FIG. 1 is a diagram of an example system 100 that may be used for developing mobile device applications. Specifically, the system 100 includes a server 101 that includes a back-end, visual programming IDE 109 for developing mobile device applications, a client device 102 that displays a front-end, visual programming interface 118 for developing the mobile device applications, and a mobile device 104 that runs the mobile device applications.

Initially as used by this specification, a "visual programming IDE" refers to a software application (or to a suite of software applications) that provides a comprehensive facility for a user of the system 100 to develop applications. The visual programming IDE may include, for example, a source code editor, a compiler, an interpreter, build automation tools, a debugger, and/or other components. The build automation tools may generate the "visual programming interface" which, as referred to by this specification, is an interface that allows a user to create applications by moving programming building blocks, modules, visual elements, or code nodes (collectively, "components"), to create flowcharts or structure diagrams which are then compiled or interpreted by the visual programming IDE.

The server 101, the client device 102, the mobile device 104 communicate with each other over one or more networks 105. The networks 105 may include a wireless cellular network, a wireless local area network (WLAN) or Wi-Fi network, a telephone network, a Third Generation (3G) or Fourth Generation (4G) mobile telecommunications network, a private network such as an intranet, a public network such as the Internet, or any appropriate combination thereof.

The server 101 may be a web application server or any other computing device that includes one or more processors 108. The server 101 may be implemented in one or more devices, arranged, for example, as a stand-alone server, a server farm, or a server cluster. Among other data, the server 101 stores one or more device profiles 120 that, for example, reference characteristics or capabilities of the different devices included within the system 100, and that identify users that are associated or paired with the different devices. The client device 102 may be any type of computing device that includes one or more processors 110, input devices 112, display devices (e.g., display device 116), and engines (e.g., engine 114). As used by this specification, an "engine" (or "software engine") refers to a software-implemented input/output system that provides an output that is different than the input. An engine may be an encoded block of functionality, such as a library, a platform, Software Development Kit ("SDK") or an object.

The mobile device 104 is any type of portable computing device, such as a cellular phone, e-book reader, tablet computer, music player, smart phone, personal data assistant (PDA), notebook computer, or other mobile device. Similar to the client device, the mobile device 104 includes one or more processors 125 and an engine 128. The engine 128 may be the same type of engine, or a different type of engine, as engine 114.

Unlike the client device 102, the mobile device 104 includes at least one hardware or software module that provides functionality which is specific to a mobile device. For instance, the mobile device 104 may include a telephony module 124a that provides telephone functionality, an accelerometer 124b that provides motion sensing functionality, a Global Positioning System (GPS) module 124c that provides position sensing functionality, a barcode scanner 124d that provides barcode reading functionality, and/or a camera 124e that provides image sensing functionality. Other hardware or software modules, such as an embedded orientation sensing module, may also be included on the mobile device 104, and may also be referred to as "sensors."

The user may interact with the visual programming IDE 109 through the client device 102 to create an application that may be automatically uploaded to the mobile device 104 by the visual programming IDE 109. Among other functionalities, the application may access one or more functionalities that are specific to the mobile device 104, such as telephone, motion sensing, or position sensing functionality. The user who creates the application using the client device 102 may be the same user, or a different user, as the user of the mobile device 104.

Once the user has created the application, the visual programming IDE 109 may generate a version of the executable code that may be executed on the client device 102. When the client device 102 executes this version of the executable code, a mock-up of the application may be displayed on the client device 102, to appear as though the application were running on the mobile device 104, and the user may interact with the mock-up. In interacting with the mock-up, the user may simulate certain inputs to the application that may be associated with mobile device-specific functionalities, even if the application is being executed on a computing device that may not actually implement these types of functionalities or generate these types of inputs. Once the user signals that they are satisfied with the application, the visual programming IDE 109 may automatically generate a version the executable code that may be executed on the mobile device 104, and may automatically provide this version of the executable code to the mobile device 104.

FIG. 1 also illustrates a flow of data within the system 100 during states (a) to (g), and two screenshots 106 and 107 of the visual programming interface 118 that are displayed on the client device 102 during states (b) and (e), respectively. The states (a) to (g) may be time-sequenced states, or they may occur in a sequence that is different than the illustrated sequence.

In more detail, during state (a), the user uses the client device 102 to log into the visual programming IDE 109 that is executing on the server 101. The visual programming IDE 109 may determine, from logon data or from user or device profiles, the identity of the user, and a type or characteristic of the client device 102. For instance, the visual programming IDE 109 may determine from logon data that the user is using a particular version of a browser. The visual programming IDE 109 may identify the user, and may access the device profiles 120 to identify devices that are paired with the user. For instance, the visual programming IDE 109 may determine from the logon data that, although the user is accessing the visual programming IDE 109 through the client device 102, the user is associated or paired with the mobile device 104.

The visual programming IDE may generate code (e.g., eXtensible Markup Language (XML) or HTML code, or JavaScript) that implements the visual programming interface 118, and that is tailored to the type or characteristic associated with the client device 102. The server 101 streams or otherwise transmits the code to the client device 102 which, during state (b), displays the visual programming interface 118 to the user. In some implementations, the visual programming interface 118 is rendered within an Internet browser on the display 116, and the code is customized for that browser.

As shown in screenshot 106, the visual programming interface 118 includes drag-and-drop components that may be selected and visually arranged by the user to define an application. The location component 130a may, for example, be selected from a contact list database 122 associated with the mobile device 104. The "ringer off" component is one example mobile device-specific functionality that may be provided by the telephony module 124a of the mobile device 104.

In the screenshot 106, the location component 130a ("Home") and the telephony module component 130b ("Ringer off") have been selected and added to an "if...then" statement that makes up a portion of the application. When executed, this portion of the application would cause the ringer of a mobile device to turn "off" when the mobile device infers that it has arrived at a "home" location. Components that are associated with other types of functionality may also be added to the application, such as mobile device-specific functionality related to the accelerometer 124b, the global positioning system (GPS) module 124c, the barcode scanner 124d, or the camera 124e, or functionality that is not mobile device-specific (e.g., "power off" or "enter hibernation mode").

During state (c), signals that reflect the user's inputs to, or other interactions with, the visual programming interface 118 are communicated to the visual programming IDE 109. For example, a signal that indicates that the user has selected of a "go" control 132 on the visual programming interface 118 may be transmitted from the client device 102 to the visual programming IDE 109.

In response to detecting that the user has selected the "go" control 132, the visual programming IDE 109 may, during state (d), generate a first binary executable 136 that is specific to the engine 114 associated with the client device 102. The first binary executable 136 is transmitted from the server 101 to the client device 102, which executes the first binary executable 136, thereby displaying a mock-up of the application. By displaying a mock-up of the application, the user may test and debug the application without having to connect the mobile device 104 to the network, or install a new executable upon the mobile device 104.

In one particular implementation, in addition to generating the first binary executable 136 and transmitting the first binary executable 136 to the client device 102, the visual programming IDE 109 identifies one or more mobile devices (e.g., mobile device 104) that are paired with the user, generates a different binary executables that are specific to those mobile devices, and transmits the different binary executable to the respective mobile devices. In doing so, a mobile device-specific executable may be automatically generated and pushed by the visual programming IDE 109 to a mobile device associated with the user, without requiring the user to interact with the visual programming IDE 109 through the mobile device, and without requiring the user to connect the mobile device to the client device 102 itself. The user may also be prompted, through the visual programming interface 118, to confirm whether they intend for the second binary executable to be pushed to a mobile device that is paired with the user, or other context data (e.g., collocation of the client device 102 and the mobile) device may be used to infer that the user intends to push the second binary executable to the mobile device.

Screenshot 107 shows the visual programming interface 118, as displayed by the client device 102 during state (e). Specifically, the screenshot 107 includes a preview pane 138 that displays the mock-up of the application, as it would appear when executed on the mobile device 104. The preview pane 138 includes a graphic that depicts the mobile device 104, to give the user a sense of how the application will appear on the mobile device 104. The particular graphic to display in the preview pane 138 may be determined from a device profile associated with the mobile device 104.

The user may interact with the controls that are depicted in the preview pane 138 by clicking on or otherwise selecting a control, to simulate selecting a control on the mobile device 104. The server 101 may determine characteristics (e.g., screen dimensions, control layout) of the mobile device 104 from the device profile associated with the mobile device 104, and may alter the mock-up of the application based on these characteristics.

The first binary executable 136 may include code that accepts inputs that the client device 102 may not be capable of generating. Accordingly, the visual programming IDE 109 may provide a capability for the user to simulate these inputs through the client device 102. For instance, while the application would otherwise accept data from a position sensor of a mobile device to determine whether the mobile device is in the "home" location, the first binary executable 136 is configured to accept simulated position sensor data, since the client device 102 may not include position sensing functionality. Accepting simulated position sensor data may include inputting stored, or "canned" position sensor data to the application, or advancing the application to a state in which the position sensor data is assumed to have already been input.

The simulated data may be predetermined data, or the user may select the data to simulate. for instance, the visual programming interface 118 may include one or more controls (e.g., a selectable, map control) that, when selected, cause simulated data to be generated and input to the application. For example, a location selection control 142 may be selected by the user to simulate GPS data associated with a particular location, such as an address derived from the contact list database 122. In FIG. 1, for example, the location selection control 142 is associated with data for the location "Home." When the control 142 is selected, the data that is associated with the control 142 is input to the first binary executable 136, to simulate the position sensor data that a mobile device would generate if the mobile device were to arrive at the "home" location. In the situation where the client device 102 is capable of generating a particular input, controls may still be used to simulate data for that input, for example to substitute simulated data for data that the client device 102 is actually generating.

If the visual programming IDE 109 has not already pushed the second binary executable 146 to the mobile device 104 (e.g., based on the mobile device 104 being paired with the user and further based on the user selecting the "go" control 132), the visual programming IDE generates a symbol (e.g., a quick response (QR) code or a bar code) that may be used to identify the application, and provides the symbol to the client device 101 for display in the download pane 140. The user may scan the symbol displayed in the download pane 140 (e.g., using the barcode scanner 124d or an image generating module, such as the camera 124e), to indicate that the application is to be pushed or transmitted from the server 1012 to the mobile device 104. If the visual programming IDE 109 has already pushed the second binary executable 146 to the mobile device 104, scanning the symbol may result in the visual programming IDE 109 sending an update version of the second binary executable 146 to the mobile device 104, or otherwise confirming that the push of the second binary executable is or was acceptable to the user.

During state (f), the barcode data 144 generated by the mobile device 104 is communicated from the mobile device 104 to the server 101. The barcode data 144 may, for instance, reference the user, the application, the client device 102, the mobile device 104, the first binary executable 136, or the second binary executable 146. The visual programming IDE 109 may use the barcode data 144, or other data that identifies the mobile device 104, to generate, as the second binary executable 146, a version of the application that is tailored to the hardware or software configuration of the mobile device 104.

During state (g), the server 101 communicates the second binary executable 146 to the mobile device 104. The second binary executable 146, for example, may be automatically installed upon the mobile device 104, or the mobile device 104 may prompt the user regarding installation. Because the transmission of the barcode data 144 may establish a direct network connection between the mobile device 104 and the server 101 that is independent of the network connection between the server 101 and the client device 102, the second binary executable 146 may be communicated directly between the mobile device 104 and the server 101 without being communicated to, or through, the client device 102 itself.

Figure 2A:
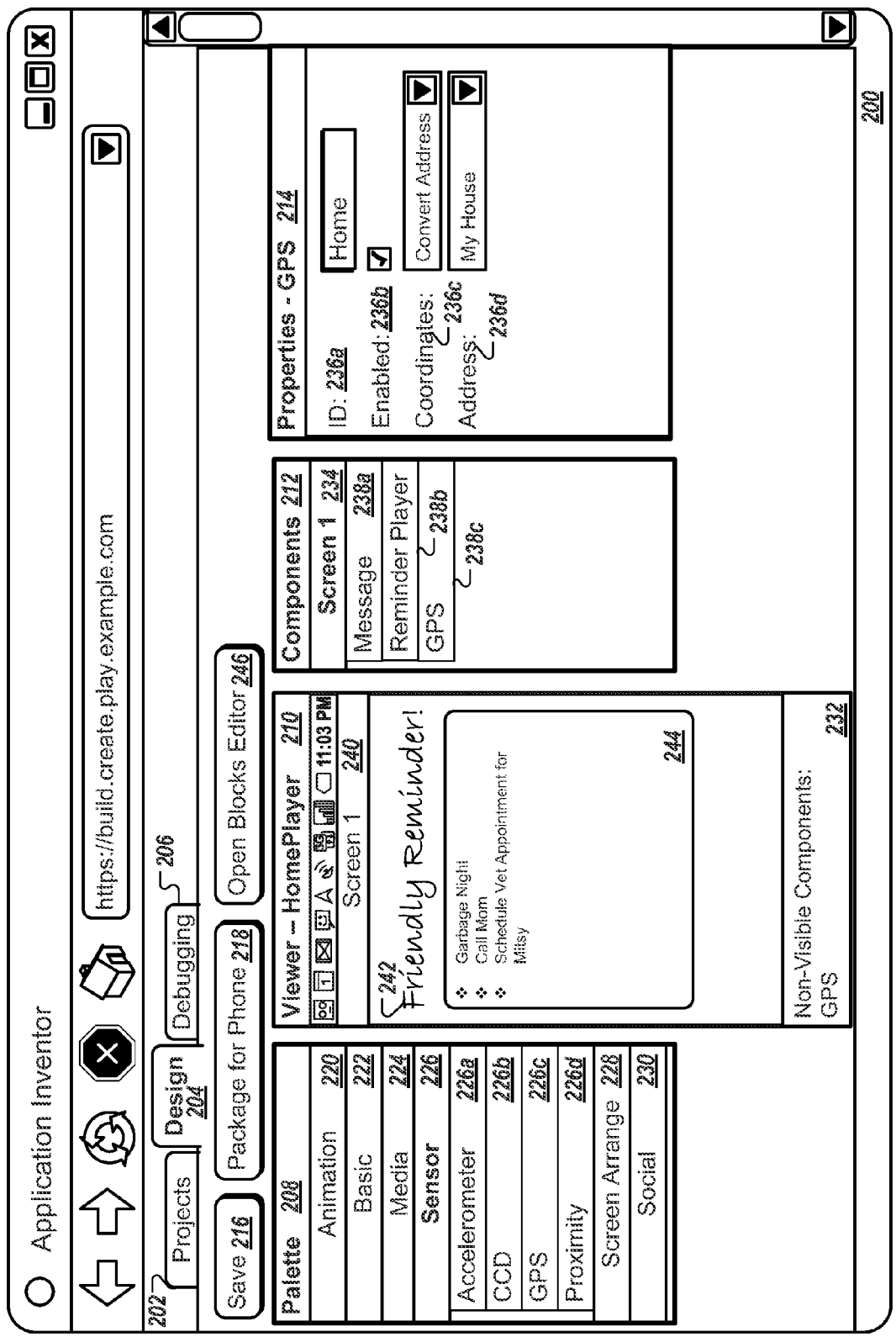
FIGS. 2A through 2D are example screenshots of a visual programming interface that may be used for developing mobile device applications.
Figure 2B:
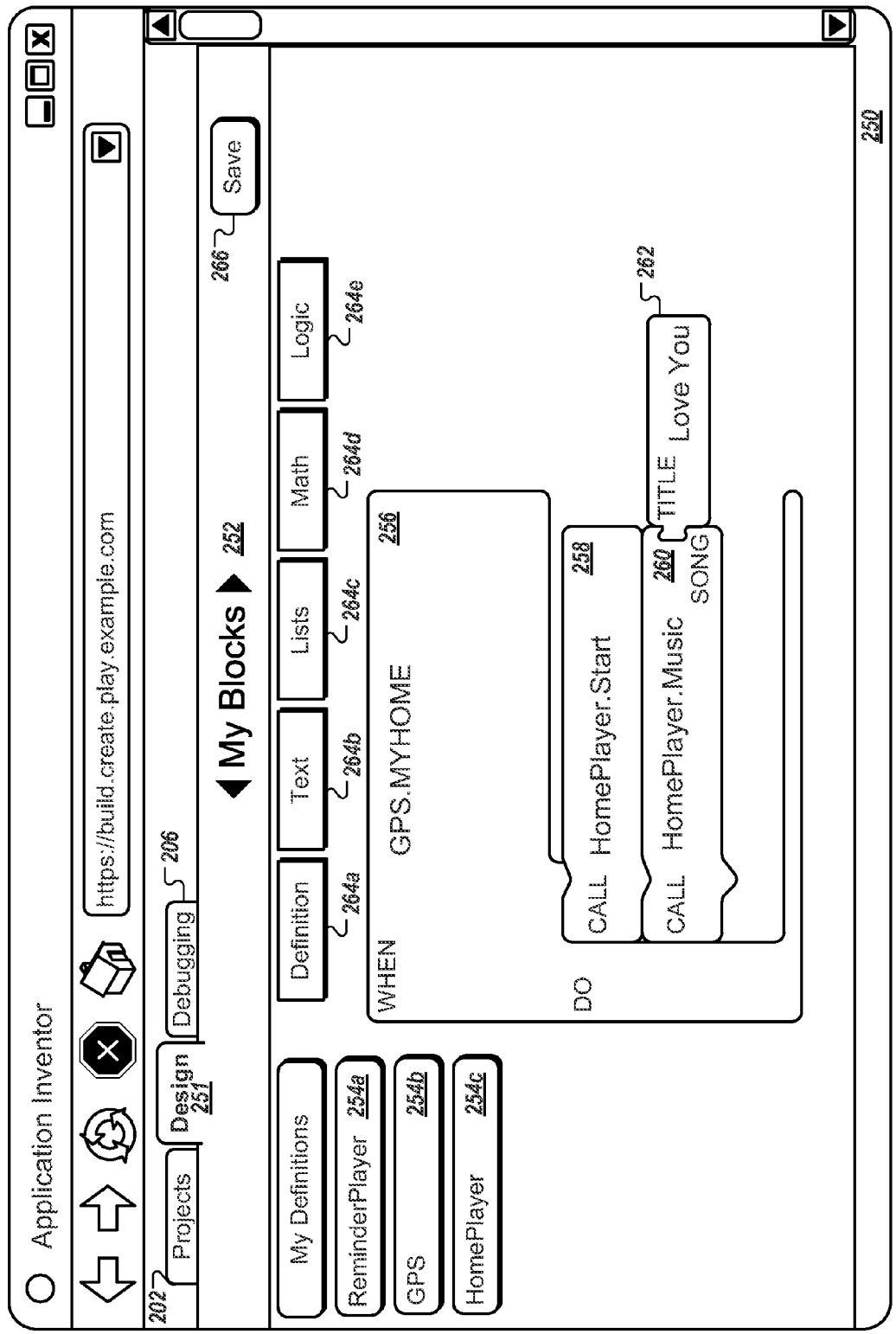

FIGS. 2A and 2B are example screenshots of a visual programming interface that may be used for developing mobile phone applications. In general, a user may use the visual programming interface to create new applications for a mobile device, or to modify an existing application, by dragging and dropping components associated with various application functionality into a web-based workspace.

As shown in FIG. 2A, a screenshot 200 shows the design screen of a web-based visual programming interface. The interface includes a projects tab 202, a design tab 204 (currently active), and a debugging tab 206. In general, through the projects tab 202, a user may access a previously completed or current project (e.g., application development) or begin a new development project. Using the design tab 204, the user may define a mobile device application with one or more components selected from a components palette 208. The mobile device application may be visualized using a preview window 210. If the mobile device application is not functioning as desired, the user may access the debugging tab 206 to locate and fix any errors.

When working in the design tab 204, for example, the user may review mobile device components in the components palette 208 and place any selected components into a components pane 212 or the preview window 210. A user may then set properties related to one or more of the selected components using a properties pane 214. Once the user has finished working on the current development project, the user may select a save button 216 to save the project or a package to phone button 218 to generate executable code for use on a mobile device.

The components palette 208 presents a list of components or features of a mobile device that the user may add to a new mobile device application. The components and features are categorized into the following headings: animation 220 (e.g., graphics features), basic 222 (e.g., menus, buttons, icons, telephony functionality), media 224 (e.g., audio, video, ringer functionality), sensor 226 (e.g., external data collection), screen arrangement 228 (e.g., zones, panes, navigation, touch response), and social 230 (e.g., social networking, texting). Other categories or components are possible, such as digital camera functionality, personal information management functionality (e.g., involving a personal information manager tool on the mobile device), or other embedded module functionality. The sensor heading 226 has been selected, and the individual sensor components, including an accelerometer 226a, a light indicator (CCD) 226b, a global positioning system (GPS) 226c, and a proximity sensor 226d are visible.

The GPS sensor component 226c, for example, has been selected by the user, either through adding it to the preview window 210 or the components pane 212. The GPS sensor component is listed within a non-visible components section 232 of the preview window 210 as well as within the components pane 212. The properties of the GPS sensor component 226c are available within the properties pane 214. These properties include an identification property 236a selected as "Home," an enabled checkbox 236b (affirmative), a coordinates drop-down menu 236c set to "convert address", and an address drop-down menu 236d set to "my house." The identification property 236a, for example, may be used to indentify this GPS setting from any other GPS settings potentially used by the same mobile device application or application project. The GPS coordinates may be selected by retrieving an address (e.g., through the personal information management functionality of the mobile device) and having the mobile device or the online development tool generate coordinates corresponding to the selected address. In another example, the user may directly input GPS coordinates.

The application being developed within the screenshot 200, for example, may correspond to a message and to-do list triggered by the mobile device returning home. The components pane 212 lists a series of components associated with a first screen 234. In some implementations, the application may span multiple screens of information. In addition to a GPS component 238c, the first screen 234 includes a message component 238a and a reminder player component 238b.

In the preview window 210, a first screen 240 (e.g., corresponding to the first screen 234) includes a message 242 "friendly reminder" (e.g., corresponding to the message component 238a) and a reminders region 244 (e.g., corresponding to the reminder player component 238b). The reminder player component 238b, in some implementations, corresponds to a module created by the user. For example, the user may select an open blocks editor button 246 to define the behavior of one or more of the components included in the mobile device application.

As shown in FIG. 2B, a screenshot 250 includes an example visual programming interface for developing mobile device applications. A design tab 251 includes a "my blocks" user interface 252. The user interface 252, for example, may be accessed by selecting the open blocks editor button 246, as described in relation to FIG. 2A. At the left of the user interface 252, a set of user definitions 254 are available for selection, including a REMINDERPLAYER definition 254a, a GPS definition 254b, and a HOMEPLAYER definition 254c. The user definitions 254, in some implementations, include sets of information related to a user-defined application module. For example, in selecting a user definition, sub-events, such as files within a folder, may be made available to the user. These sub-events may describe specific property settings or conditions for each definition.

The HOMEPLAYER definition 254c, for example, is open for editing within the user interface 252. The HOMEPLAYER module may be activated by a when block 256 labeled "GPS.MY-HOME". For example, when the GPS sensor within the mobile device determines that the mobile device has reached the user's home address, the HOMEPLAYER module is activated. Two call blocks 258 and 260 have been added to the when block 256. The first call block 258 is labeled "HOMEPLAYER.Start", and the second call block 260 is labeled "HOMEPLAYER.Music" of type song. Connected to the second call block 260 is a title block 262 labeled "Love You". When running the HOMEPLAYER module, for example, upon returning home, the mobile device may automatically begin to play the song "Love You".

In generating a module such as the HOMEPLAYER module, the user may select from a series of functional blocks 264 including a definition block 264a, a text block 264b, a lists block 264c, a math block 264d, and a logic block 264e. These blocks, for example, may correspond to variable types or function calls within a programming language. For example, when rendering a title to the screen or passing a file name to a function such as the mobile device audio player, the user may select and customize the text block 264b.

Once the user has finished editing the HOMEPLAYER module, the user may select a save button 266 to save the module and return to the design tab 204 displayed in relation to FIG. 2A. In some implementations, rather than opening within the same browser window, the user interface 252 is displayed within a separate browser tab or within a pop-up window or additional browser application, allowing the user to switch between the blocks user interface 252 and the design tab 204 described in relation to FIG. 2A while defining a new mobile device application.

Figure 2C:
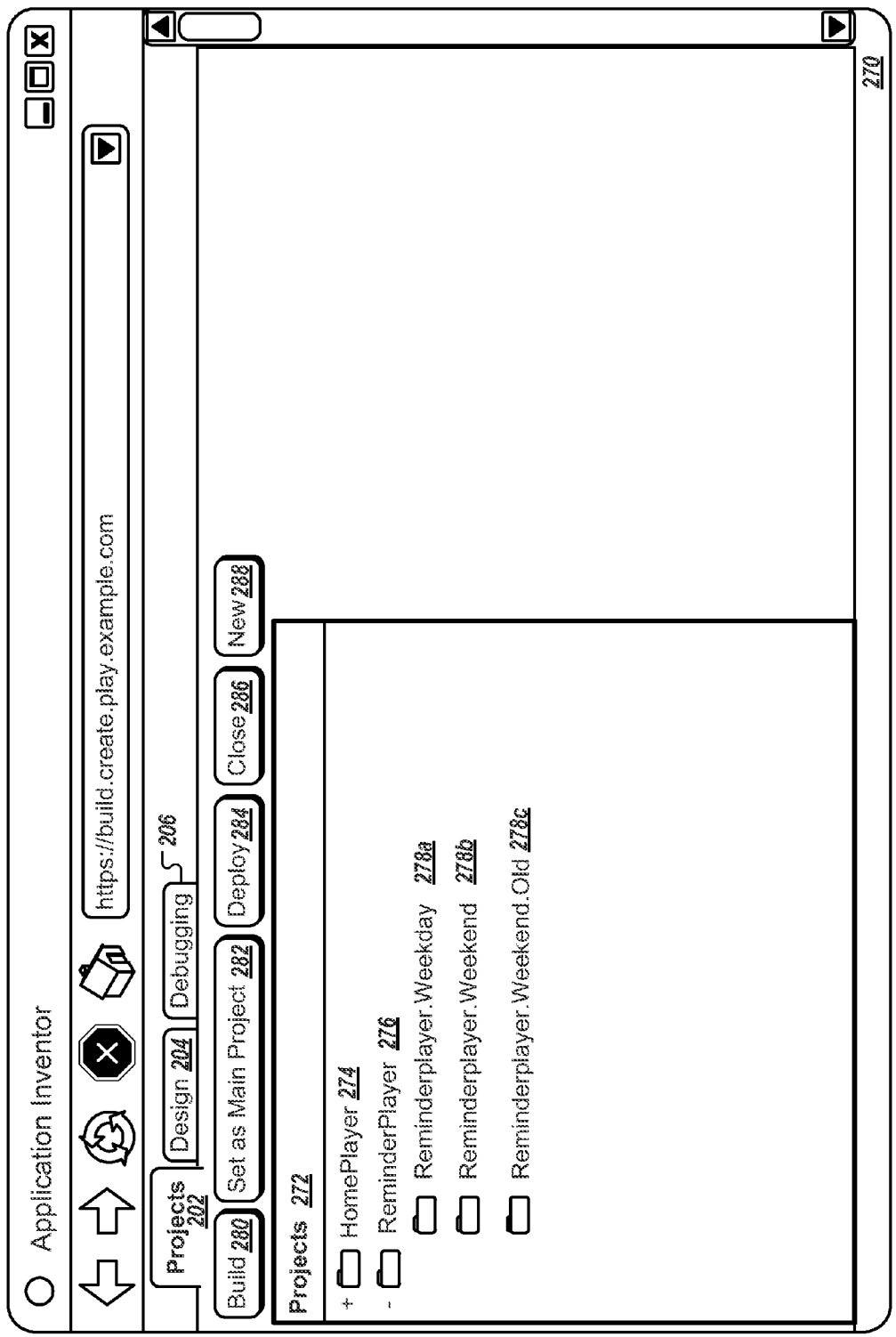

As shown in a screenshot 270 in FIG. 2C, selection of the projects tab 202 navigates the user to a projects directory 272 containing a HOMEPLAYER project 274 and a REMINDERPLAYER project 276. The REMINDERPLAYER project 276 includes three sub-projects: REMINDERPLAYER.WEEKDAY 278a, REMINDERPLAYER.WEEKEND 278b and REMINDERPLAYER.WEEKEND.OLD 278c. A user, for example, may visit the project directory 272 to open, delete, rename, reorganize, or download one or more projects.

A series of buttons are available above the project directory 272. A build button 280, when selected, may build a mock-up version in a preview window of the mobile device application defined by the selected project. The user may verify functionality of the project in the preview window prior to deploying the mobile device application to a mobile device. A "set as main" project button 282 may set the selected project as the default project, making the project immediately available whenever the user accesses the web-based visual programming interface. A deploy button 284 may be used to generate executable code related to the selected project. The executable code, for example, may be uploaded to a mobile device. A close button 286 may be used to close the selected project. A new button 288 may be used to create a new project in the project directory 272. If the user has selected an existing project, for example, the new project may be created as a sub-project of the existing project. A sub-project, in some implementations, may inherit the user-designed modules, screen layout, and component selection(s) associated with the parent project.

Figure 2D:
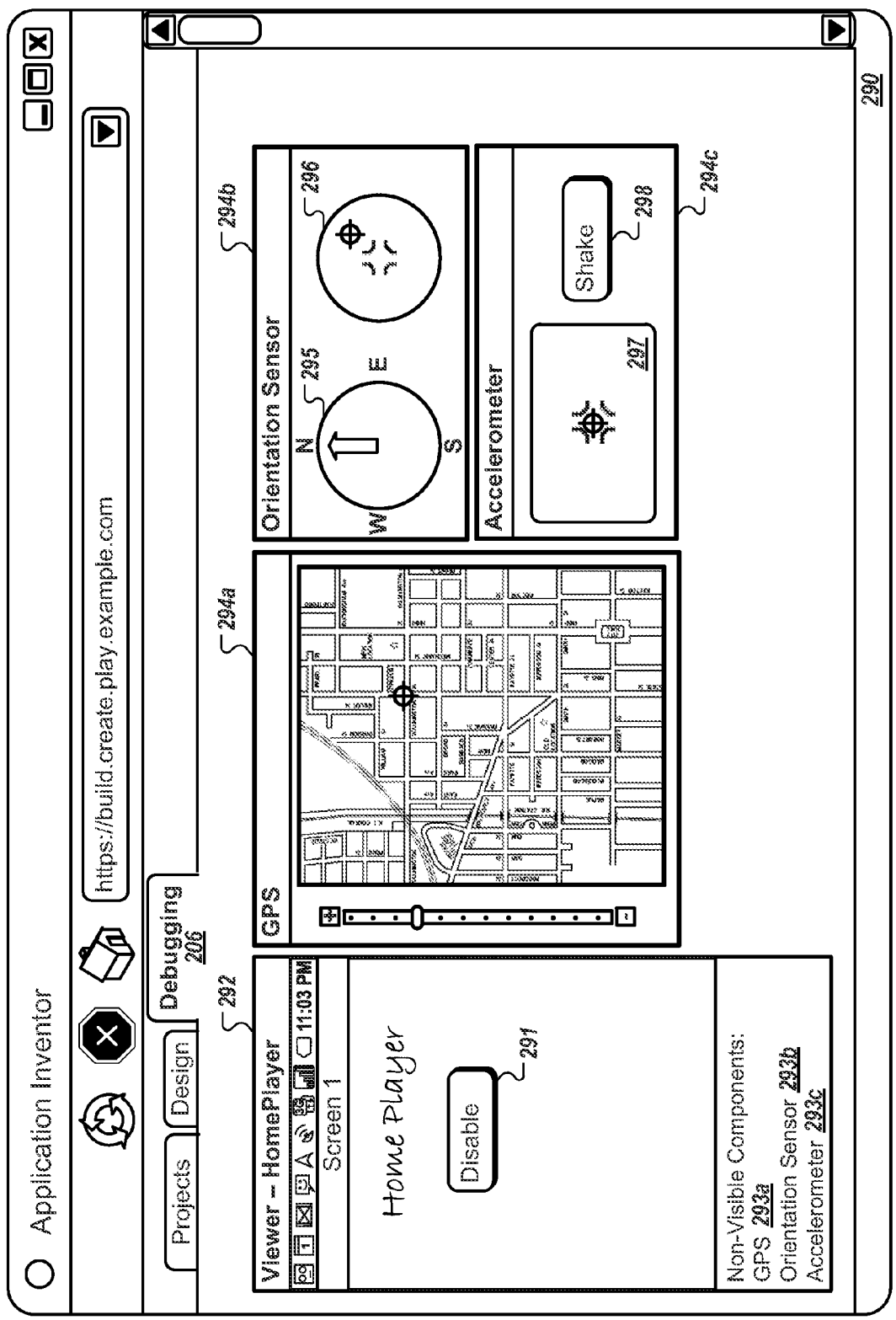

FIG. 2D is a screenshot 290 illustrating the debugging screen of a web-based visual programming interface. The debugging tab 206 has been selected. A preview pane 292 provides the user with a mock-up of a mobile device application recently designed by the user. The user may interact with the mock-up version to verify functionality or to debug any problems. In some implementations, the mock-up version may be generated using a different binary executable than the application which would be installed upon a mobile device. For example, functionality available through a mobile device, such as text messaging functionality, accelerometer functionality, telephone functionality, bar code reading functionality, ringer functionality, position determination functionality, embedded module functionality, proximity sensor functionality, light detection functionality, orientation sensing functionality, camera functionality, personal information management functionality, or social networking functionality may be simulated through code substituted or added into a binary executable version generated to execute within a visual programming IDE. The simulation may include one or more input boxes or user controls for providing inputs typically received externally from a mobile device or through sensor data.

The preview pane 292 includes a message "HOMEPLAYER" and a disable button control 291. Beneath the screen mockup, a set of non-visible components 293 is listed, including a GPS component 293a, an orientation sensor component 293b, and an accelerometer component 293c. The non-visible components 293 each map to a component emulator, such as a GPS emulator 294a, an orientation emulator 294b, and an accelerometer emulator 294c. The user may interact with the controls within each of the emulators 294 to simulate inputs to the non-visible components 293.

Using the GPS emulator 294a, the user may select a location on a map to provide GPS coordinates to the mock-up application displayed in the preview pane 292, simulating data received from the GPS component 293a. In some implementations (not illustrated), an address could be entered, coordinates could be directly entered, or an address could be selected from a personal information management module, such as a contacts database available through the mobile device. In addition to a static location, in some implementations (not illustrated), the user may select a route between two locations. The route, for example, may include an average speed.

The orientation emulator 294b emulates events received from the orientation sensor component 293b. The user may interact with a compass control 295 to set a direction and a tilt control 296 to simulate a tilt. For example, using the tilt control 296, selection above center may indicate forward, selection below center may indicate backwards, and selection to the left or right of center may indicate tipping the mobile device to the left or the right.

The accelerometer emulator 294c simulates events generated by the accelerometer component 293c. An acceleration window 297 may be used to select forward, backward, or sideways acceleration, depending upon the position of the user activation in relation to the center point. The further from the center point, for example, the faster the resultant acceleration input. The user may instead or additionally select a shake button 298 to simulate shaking the mobile device.

In addition to graphical display controls and the emulators 294, in some implementations, physical controls, such as buttons or navigation controls available on a mobile device, may be displayed as part of the mock-up in the preview pane 292 (not illustrated). For example, the user could verify functionality when selecting characters on a keypad of a mobile device or when triggering a call button.

Figure 3A:
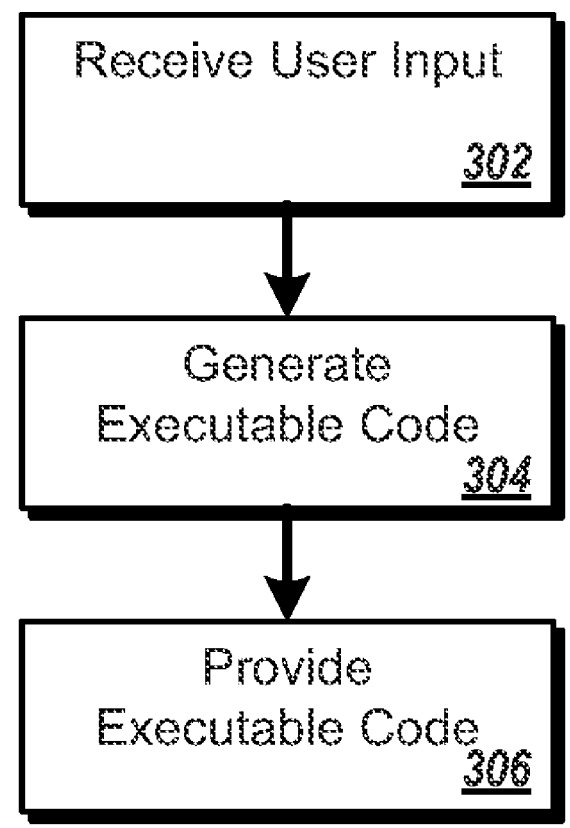
FIGS. 3A through 3C are flowcharts of processes for developing mobile device applications.

FIG. 3A is a flow chart of a process 300 for developing mobile device applications. Briefly, the process 300 may be used in creating new mobile device applications or modifying existing mobile device applications using a web-based visual application development tool.

The process begins with receiving user input through a visual programming interface (302). One or more of the user inputs, for example, may involve selecting and arranging components that define an application for a mobile device. At least one of the components may access functionality that is specific to mobile devices such as, in some examples, accelerometer functionality, telephone functionality, text messaging functionality, bar code reading functionality, position determination functionality, proximity detection functionality, light detection functionality, social networking functionality, camera functionality, or personal information management functionality.

In some implementations, the visual programming interface may include a web-based visual programming interface. For example, a user working at a computing device may access a mobile device application development tool through a network connection. The development tool, in some implementations, may include a preview window that displays a mock-up of the application that the user is currently developing, demonstrating how the application may appear on a mobile device.

Executable code is generated (304). The user, after arranging the components defining the application, may choose to build an executable code version of the defined application for use with a mobile device. The executable code may be stored within a networked storage device (e.g., controlled by the system providing the web-based development tool) or locally at the user's computing device. In some implementations, the executable code includes installation functionality as well as the application functionality. One or more versions of the executable code may be generated for a particular application under design, for instance to provide different versions of the executable code to be run on systems with different characteristics.

In some implementations, along with generating the executable code, a quick response code uniquely identifying the application may be generated. The quick response code may be provided to the mobile device to allow the mobile device access to the executable code, for example, stored within the networked system.

Executable code is provided to a mobile device (306). If the executable code is stored within a local storage, the mobile device may be connected to the user's computing device to upload the executable code. If the executable code is stored within a networked drive, the mobile device may be used to access the web-based system and retrieve the executable code. If a quick response code was generated, the user may provide the mobile device with the quick response code, and the mobile device may be used to access executable code using the quick response code.

In some implementations, the quick response code is generated on the display of the user's computing device as a bar code image. The user may scan the bar code, for example using a bar code scanner or a digital camera built into the mobile device. After scanning the bar code, the user may access a networked resource (e.g., through a URL) to retrieve the executable code using the quick response code. In other implementations, the executable code is provided to a mobile device that the visual programming IDE identifies as being paired with the user.

Once the executable code has been transferred to the mobile device, the executable code may be installed to run the application. For example, the application may appear within an application menu or a collection of icons in the display area of the mobile device.

Figure 3B:
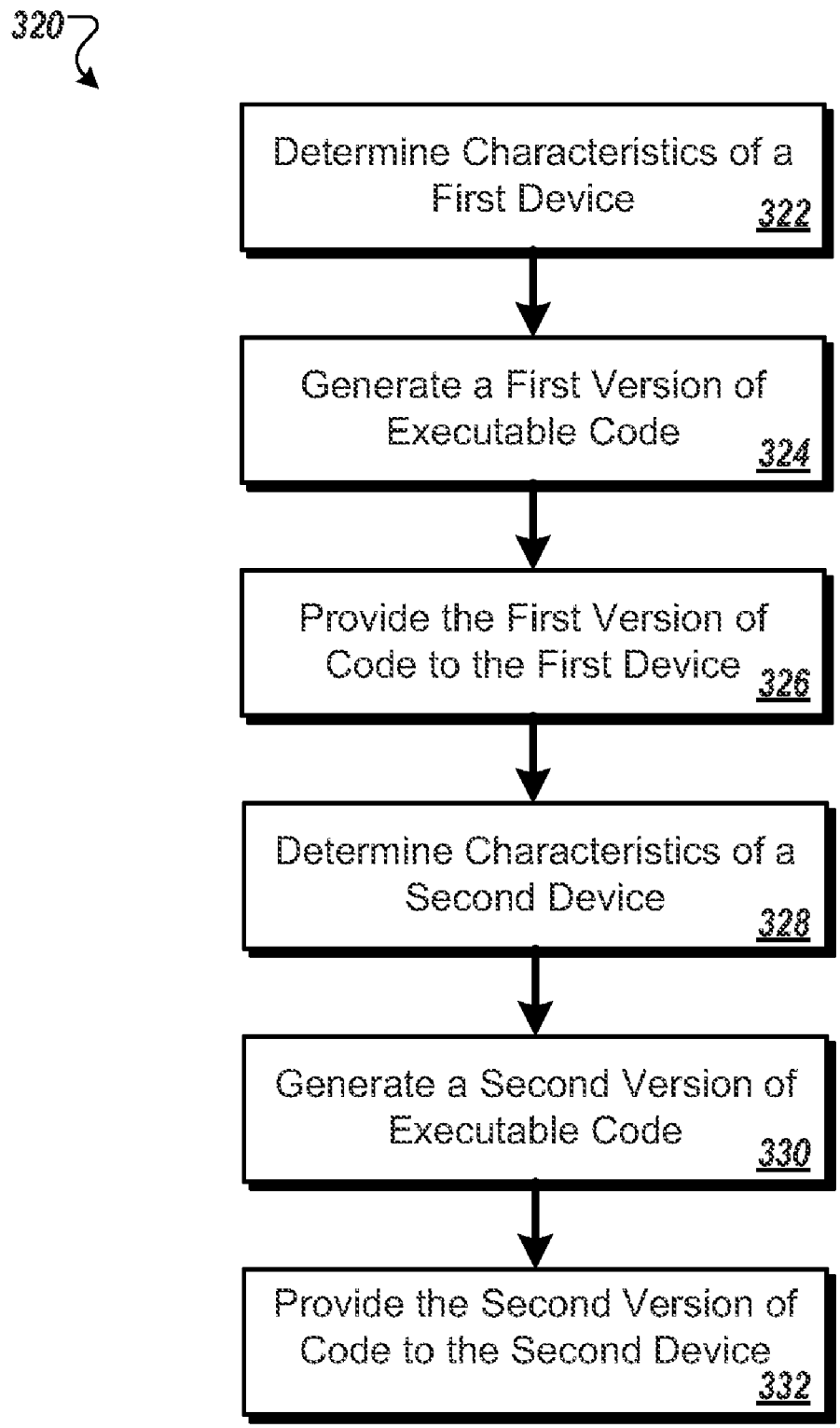

FIG. 3B is a flow chart of a process 320 for developing mobile device applications. Briefly, the process 320 may be used in creating binary executable code for previewing or running mobile device applications designed using a web-based visual application development tool. The binary executable code, for example, may be generated by a visual programming IDE.

The process 320 begins with determining characteristics of a first device (322). For example, it may be determined that a mobile device application is going to be executed in a browser environment of a non-mobile computing device. Further, hardware, software, or firmware characteristics of the first device, in some implementations, may be determined.

A first version of executable code is generated based on the characteristics of the first device (324). For example, a browser-specific version of executable code may be generated. The executable code may simulate a mobile device application.

The first version of executable code is provided to the first device (326). The first version of executable code may be downloaded to the first device. Alternatively, the first version of executable code may be streamed to a virtual runtime environment on the first device from an application server. Other implementations are possible.

Characteristics of a second device are determined (328). For example, it may be determined that the application is going to be executed in a mobile device operating system environment. Additionally, a device model, operating system version, hardware characteristics, firmware characteristics, or software module installations may be determined. In some implementations, the characteristics of the second device may be determined through device information provided by the first device or the second device. A device profile associated with the user or the particular device registered to the particular user, in some implementations, may be accessed to determine characteristics of the second device.

A different, second version of executable code is generated (330). For example, a mobile device operating system-specific version of the executable code may be generated. The executable code, in some implementations, may be generated to be compatible with particular hardware and software components available on the second device.

The second version of executable code is provided to the second device (332). In some implementations, the second version of executable code may be provided to the second device by a visual programming IDE through a network. The second version of executable code, in some implementations, may be downloaded to the second device from the first device.

In some implementations, characteristics of both the first device and the second device may be considered when generating the first version of executable code. For example, the first version of executable code may include a mockup of the particular physical control layout of the second device, as well as visible and non-visible components available to the second device.

Figure 3C:
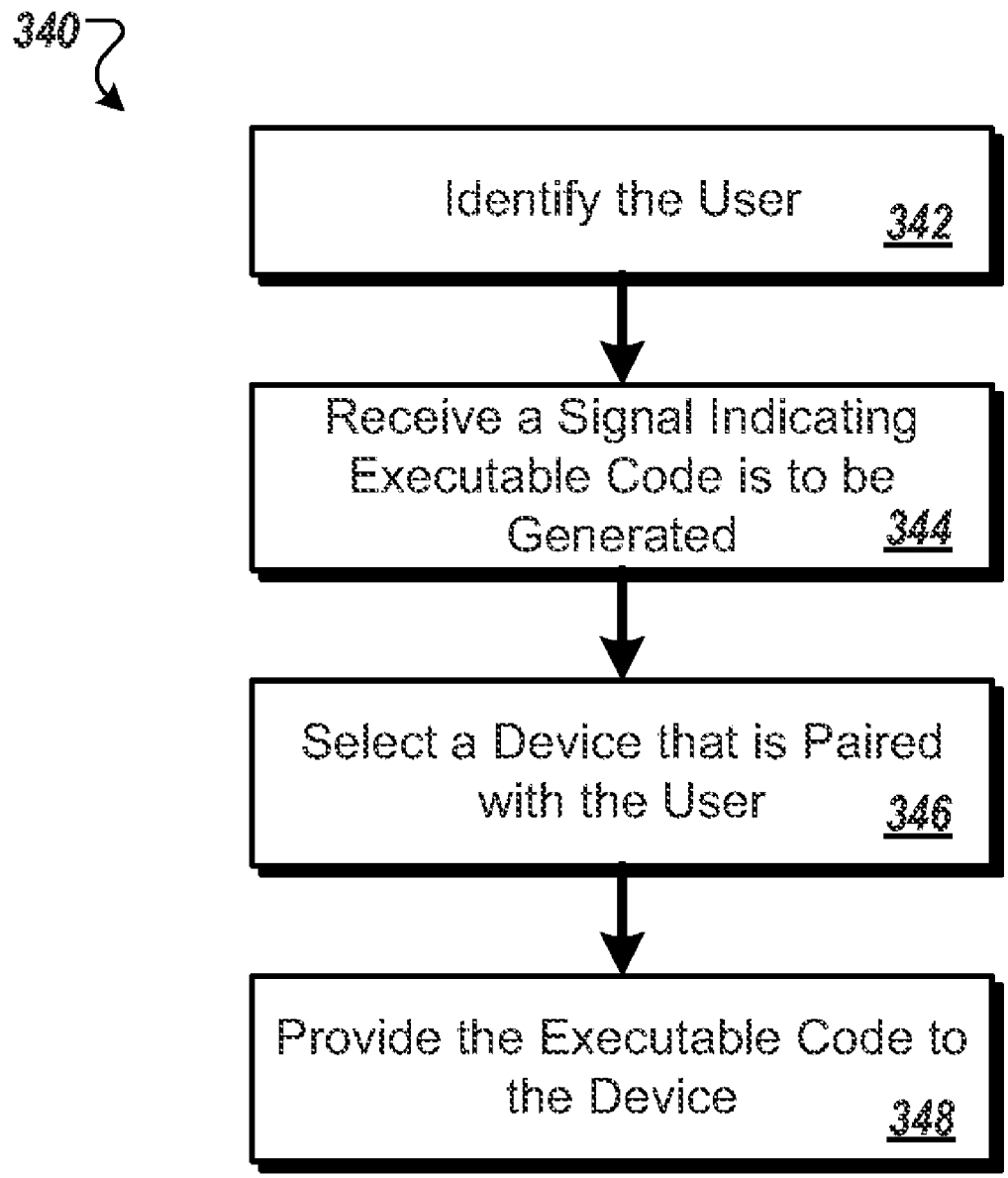

FIG. 3C is a flow chart of a process 340 for developing mobile device applications. Briefly, the process 340 may be used in creating binary executable code for running mobile device applications designed using a web-based visual application development tool. The binary executable code, for example, may be generated by a visual programming IDE.

The process 340 begins when the visual programming IDE identifies the user (342). For example, the user may log into the web-based visual application development tool with user account settings, such as a user name and password. In another example, identification provided in a message from a client device, such as an account number, telephone number, or IP address, may be used to identify the user of the device. The user, for example, may have device profile settings associated with one or more devices.

A signal is received indicating that the executable code is to be generated (344). For example, the visual programming IDE may determine that the user has selected a control on the visual programming interface of the client device to indicate that the executable code is to be generated. In another example, the visual programming IDE may determine that the user has selected a control on a mobile client device to indicate that the executable code is to be generated. In another implementation the executable code may be dynamically generated as the user selects and arranges components on the visual user interface.

The visual programming IDE identifies a mobile device that is paired with the user (346). For example, information regarding the mobile device may be linked to a user profile account in the visual programming IDE. The mobile device may or may not be connected to the client device that is displaying the visual programming interface.

In addition to or instead of generating a first binary executable and transmitting the first binary executable to the client device, the visual programming IDE identifies one or more mobile devices that are paired with the user, generates a different binary executables that are specific to those mobile devices, and transmits the different binary executable to the respective mobile devices. In doing so, a mobile device-specific executable may be automatically generated and pushed by the visual programming IDE to a mobile device associated with the user, without requiring the user to interact with the visual programming IDE through the mobile device, and without requiring the user to connect the mobile device to the client device itself. The user may also be prompted, through the visual programming interface, to confirm whether they intend for the second binary executable to be pushed to a mobile device that is paired with the user, or other context data device may be used to infer that the user intends to push the second binary executable to the mobile device.

The executable code is provided to the second client device (348). The executable code, for example, may be downloaded to the second client device from the visual programming IDE. Downloading may occur with or without requiring the user to explicitly authorize the download, depending upon whether the user has opted to authorize this service.

Figure 4:
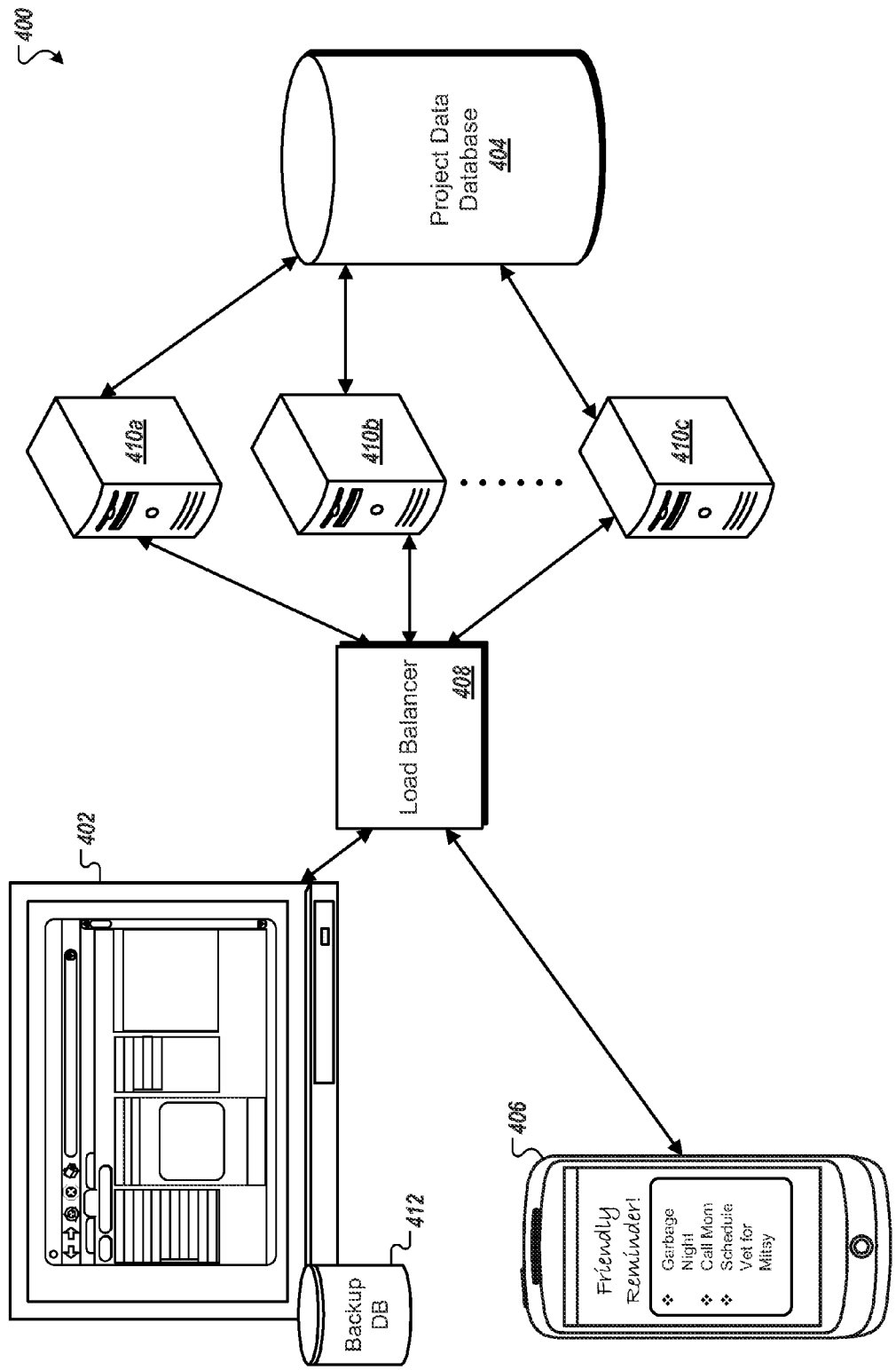

FIG. 4 is a diagram of an example system 400 for developing mobile device applications. Briefly, the system 400 provides a browser-based user interface for generating new mobile device applications. A user, working at a first client device 402, may access a web site for developing mobile device applications. The web site may include a visual programming interface that presents the user with one or more components that may be used to access functionality of the mobile device. These components, in some examples, may include digital camera functionality, sensor functionality, or telephony functionality. As the user designs the new application, the resultant mobile device application project may be stored remotely within a project data database 404. Once the user has completed development of the new mobile application, the application may be downloaded to a second client device 406. A user may gain access to the system 400, for example, through registering the second client device 406 with the device manufacturer and joining an online mobile device application development community. In another example, the system 400 may be presented within a classroom setting to introduce students to basic telecommunications technologies and mobile communication features.

The web site accessed by the user may include an visual programming IDE which allows a user having basic understanding of software development principles to build a mobile device application. Through the application development process, the user may access the underlying capabilities of the second client device 406, using these features in new combinations and with new outcomes. For example, the user may drag and drop mobile device components or features into a workspace. The user may specify within the workspace an interrelation between the device components or features. For example, the user may select graphics, multimedia, sensors, social networking, or other mobile device capabilities. The user may arrange the components to interact using a visual programming interface. If a user has trouble recognizing incoming calls when the user's phone is in her purse, for example, the user may access data collected by a light detection sensor, such as a charge-coupled device (CCD) sensor, to create an application which automatically adjusts the volume of the ringtone when the device has been placed in a dark location (e.g., a pocket or purse).

In some implementations, the user may test a mock-up of the mobile device application on the first client device 402 within a preview window. For example, a mock-up version of the application designed by the user may be generated for testing and verification prior to uploading the mobile application to the second client device 406. The preview window may include one or more controls, such as icons or buttons, used to simulate sensor input. For example, a shake button may be activated to simulate shaking the mobile device.

To meet the needs of multiple developers within the system 400, while ensuring fast and dependable interaction for each user interfacing with the visual programming IDE, the system 400 may include a load balancer 408 distributing data traffic between each computing device, such as the first client device 402, and multiple data servers 410. The load balancer 408 may include hardware, software, or a combination thereof functioning to distribute requests for the mobile application development tool received from multiple users on multiple computing devices. In some implementations, the load balancer 408 may include a multi-layer switch or a domain name system (DNS) server capable of distributing traffic to the data servers 410 with high availability and failover.

The data servers 410 may supply information to the visual programming IDE running upon the first client device 402, and may store project information for the user in the project data database 404. The project information, for example, may include ongoing and previously developed applications and user-designed components (e.g., a widget, graphic, audio file, or other component which the user may include in one or more application projects). The project data database 404 may include one or more digital storage devices, physically connected or inter-networked. In some implementations, a user may store ongoing projects or previously developed projects locally as well within a backup database 412.

In some implementations, the user may connect to the system 400 using the second client device 406 to download an application. For example, the user may point the second client device 406 to the uniform resource locator (URL) of the visual programming IDE or an associated site where the user may retrieve executable code corresponding to the newly developed mobile device application.

The second client device 406, in some implementations, may be provided with a quick response code for use in downloading the executable code. For example, once the mobile application has been compiled into executable code for use by the second client device 406, the visual programming IDE may render a bar code upon the display of the first client device 402 corresponding to the executable code. The user may scan the bar code using the second client device 406 to collect the quick response code. The second client device 406 may then retrieve executable code from the project data database 404 using the quick response code and install the new mobile device application.

If the mobile device has been registered in relation to a user account in the online development environment, in some implementations, the user may select a download control within the user interface to push the application to the registered mobile device. For example, upon selection of a "download app" button, a compiled binary executable may be transmitted from the data servers 410 to the second client device 406.

If the project data has been stored to a backup database 412, the user may connect the second client device 406 to the first client device 402 or the backup database 412 to retrieve the executable code. In some examples, the second client device 406 may be tethered to the first client device 402 using a USB cable or wirelessly connected using Bluetooth or radio frequency (RF) communications.

Upon receiving the executable code, the mobile application may be executed on the second client device 406. For example, the application may be launched from a list of applications in an application menu or as a selectable icon upon the display of the second client device 406.

Although the system 400 has been described in relation to developing new applications, in some implementations, the user may choose to modify an existing application. For example, the user may select an existing application, either professionally developed or developed by a different user of the system 400 (e.g., a friend or a member of an online mobile device application development community). The selected application may be modified by the user prior to installing the application upon the second client device 406. In some implementations, the visual programming IDE may include a collection of example mobile device applications.

Figure 5:
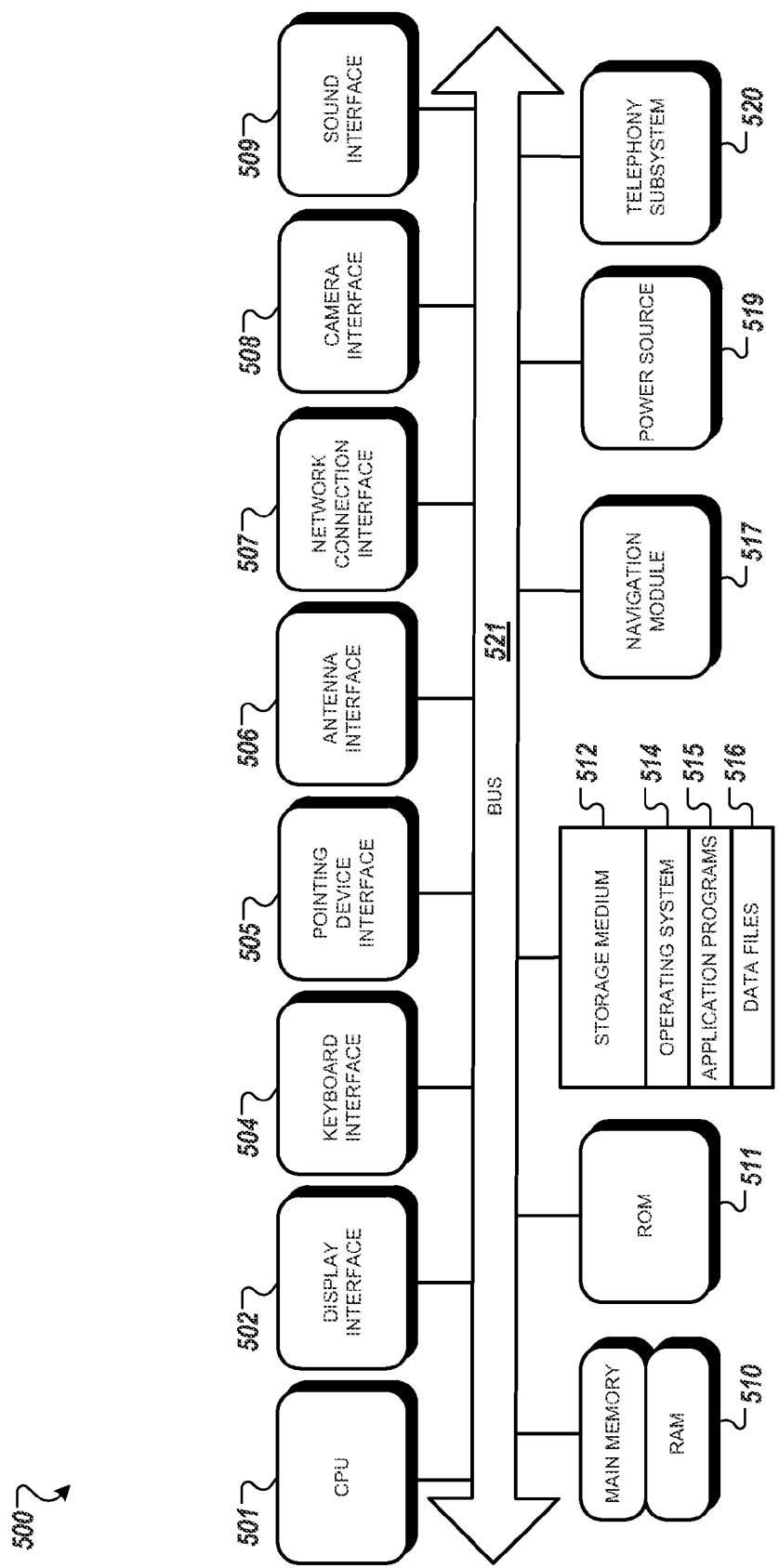
FIG. 5 is a block diagram of an example internal architecture.

FIG. 5 is a block diagram illustrating an example internal architecture 500 of the second client device 406. The architecture includes a central processing unit (CPU) 501 where the computer instructions that comprise an operating system or an application are processed; a display interface 502 that provides a communication interface and processing functions for rendering video, graphics, images, and texts on the display of the second client device 406, provides a set of built-in controls (such as buttons, text and lists), and supports diverse screen sizes; a keyboard interface 504 that provides a communication interface to a keyboard input device; a pointing device interface 505 that provides a communication interface to a pointing input device; an antenna interface 506 that provides a communication interface to an antenna; a network connection interface 507 that provides a communication interface to a network; a camera interface 508 that provides a communication interface and processing functions for capturing digital images from a built-in camera; a sound interface 509 that provides a communication interface for converting sound into electrical signals using a microphone and for converting electrical signals into sound using a speaker; a random access memory (RAM) 510 where computer instructions and data are stored in a volatile memory device for processing by the CPU 501; a read-only memory (ROM) 511 where invariant low-level systems code or data for basic system functions such as basic input and output (I/O), startup, or reception of keystrokes from the keyboard are stored in a non-volatile memory device; a storage medium 512 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 514, application programs 515 (including, for example, a web browser application, a widget or gadget engine, and mobile applications created using the system 400) and data files 516 are stored; a navigation module 517 that provides a real-world or relative position or geographic location of the second client device 406; a power source 519 that provides an appropriate alternating current (AC) or direct current (DC) to power components; and a telephony subsystem 520 that allows the second client device 406 to transmit and receive sound over a telephone network. The constituent devices and the CPU 501 communicate with each other over a computer bus 521.

The CPU 501 may be one of a number of computer processors. In one arrangement, the computer CPU 501 is more than one processing unit. The RAM 510 interfaces with the computer bus 521 so as to provide quick RAM storage to the CPU 501 during the execution of software programs such as the operating system application programs, and device drivers. More specifically, the CPU 501 loads computer-executable process steps from the storage medium 512 or other media into a field of the RAM 510 in order to execute software programs. Data is stored in the RAM 510, where the data is accessed by the computer CPU 501 during execution.

The storage medium 512 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the second client device 406 to access computer-executable process steps, application programs and the like, stored on removable and non-removable memory media, to off-load data from the second client device 406, or to upload data onto the second client device 406.

A computer program product is tangibly embodied in storage medium 512, a machine-readable storage medium. The computer program product includes instructions that, when read by a machine, operate to cause a data processing apparatus to store image data in the mobile device. In some implementations, the computer program product includes instructions that generate a visual programming environment for developing applications for mobile devices.

The operating system 514 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 514 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 514, and the application programs 515 such as an email, instant messaging, a video service application, a mapping application, word processing, spreadsheet, presentation, gaming, mapping, web browsing, JAVASCRIPT engine, or other applications. For example, one implementation may allow a user to access the GMAIL email application, an instant messaging application, a social networking application, a video service application, a mapping application, or an imaging editing and presentation application. The application programs 515 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for a web-based visual programming environment for developing mobile device applications using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 517 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 517 may also be used to measure angular displacement, orientation, or velocity of the second client device 406, such as by using one or more accelerometers.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of all of the functional operations described in this specification may be implemented in digital electronic circuitry, or in computer software, firmware, or hardware, including the structures disclosed in this specification and their structural equivalents, or in combinations of one or more of them. Aspects may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, aspects may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Aspects may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Figure 6:
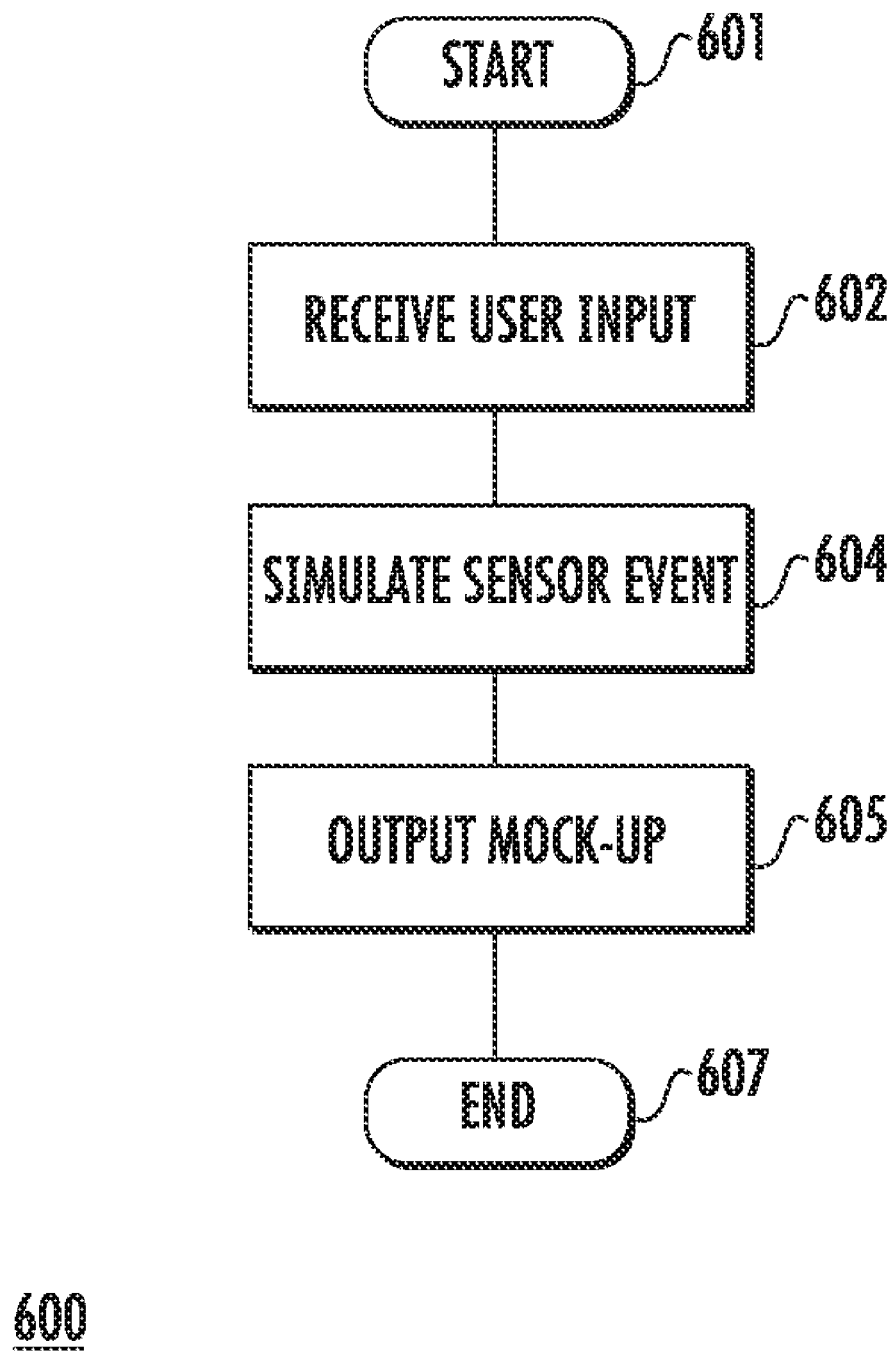
FIG. 6 is a flowchart of a process for troubleshooting a mobile device application.

FIG. 6 is a flowchart of a process 600 for troubleshooting a mobile device application. Briefly, the process 600 includes receiving a user input entered through a visual programming interface of a visual programming IDE, advancing a mobile device application that is under development in the visual programming IDE to a state in which one or more sensor events that are associated with the user input are assumed to have been received, and outputting a mock-up of the mobile device application in the advanced state, through the visual programming interface. In performing the process 600, mobile device-specific functionality may be simulated on a computer that otherwise does not include this functionality, enhancing the user's ability to efficiently test mobile device applications before deploying the mobile device applications on an actual mobile device.

As used by this specification, a "sensor event" refers to an instance of sensor data, which may include multiple items of information. Sensors, such as accelerometers, orientation sensors, or cameras, generate formatted sensor data that may reference, for example, a sensor type, a time-stamp, accuracy information, and sensor readings. The sensor event may specify, or may be processed to determine, the physical conditions surrounding the sensor.

Sensor events received from a camera or an accelerometer may suggest, for example, that the sensor is in a device that is moving or is standing still. In this regard, a component of an application may perform a test to determine whether sensor events (or whether specific sensor events) have been received or input to an application, or if the sensor readings included in the sensor events prove or suggest the occurrence of a certain physical condition. Where the component of the application requires the occurrence of a certain physical condition before triggering an action, the sensor event is considered to be satisfactory if it proves or suggests that the certain physical condition is occurring or has occurred.

Because the user may interact with the visual programming IDE on a device that does not include mobile device-specific functionality, such as a desktop computer that does not have the ability to generate accelerometer data, the process 600 allows the user to troubleshoot the applications by simulating the occurrence of certain sensor events. For example, to test functionality of a mobile device application that may rely on the occurrence of certain accelerometer sensor events or orientation sensor events, the process 600 may allow a user to select a "simulate shaking" button or to manipulate a virtual, on-screen compass, respectively, to simulate the effect that corresponding sensor events would have on a the application. In doing so, the full functionality of the application may be tested before the application is ever deployed to a mobile device, providing reliable, deterministic and reproducible testing of an application.

Simulation of a sensor event may occur by automatically or manually bypassing a portion of a mobile device application that tests whether a sensor event has been received, or that tests whether sensor events satisfy certain criteria. Bypassing this portion of the mobile device application may include replacing or substituting application logic that tests sensor events with application logic that determines the occurrence of other acts, such as button presses, application states, or timer firings. In this regard, from the perspective of the application component that takes action upon the occurrence of a sensor event, simulation of the sensor event places the application in a state in which the component assumes that the sensor event has already occurred.

In more detail, when the process 600 begins (601), a user input is entered through a visual programming interface of the visual programming IDE (602). In general, the user input allows the user to simulate the receipt of a sensor event, by interacting with a visual programming interface that is displayed on a client device that does not include a sensor which is capable of actually generating the sensor event. When the visual programming IDE is server-based, the user input is received through the visual programming interface that is displayed on a client device, and the client device transmits data that references the user input to the server.

The user input may be received when the user selects a control on the visual programming interface, such as an on-screen button that is labeled with the type of a sensor event that the user intends or desires to simulate ("Press here to simulate receiving a telephone call"). In other implementations, the control may allow the user to input additional context about a desired sensor event to simulate, such as a type (e.g., accelerometer sensing type, direction sensing type, location sensing type) of sensor event ("Press here to simulate receiving a telephone call from Bob"), a magnitude ("Press here to simulate slight shaking"), direction ("Point the compass in the direction that you want to simulate"), volume, quantity, degree or extent ("Press here to simulate receiving a third text message") of the sensor event, or other information (e.g., screen coordinates or geographic coordinates, "vigorous", "negligible," above or below a predefined threshold, "north," "235°"). A single user input may correspond to one sensor event (e.g., simulate location "Work"), or multiple sensor events (e.g., simulate receiving call from "Telemarketer" while at location "Work") received simultaneously, sequentially, or near in time to each other.

In other implementations, where the user interacts with a control to generate the sensor event, the user input may be processed before the receipt of the sensor event is simulated. For instance, a map control may be displayed on the visual programming interface. When the user selects a point on the map control, data that describes the point (e.g., screen coordinates) may be transmitted to an external mapping application or service that outputs geographic coordinates that correspond to the selected point. In simulating the mobile device application in a state in which the sensor event is received, the geographic coordinates may be input into the application to generate a mock-up of the application as it would appear if the mobile device running the application were located at the selected point.

One such control is a GPS emulator (e.g., GPS emulator 294a of FIG. 2D), which allows the user to select a location on a map to provide GPS coordinates to the mock-up application displayed in the preview pane, simulating data received from a location sensor. In other implementations, the user may enter an address or coordinates through the control, or an address could be selected from a personal information management module, such as a contacts database available through the mobile device. In addition to a static location, in some implementations (not illustrated), the user may select a route between two locations. A different control, such as a button that is labeled "Simulate Home Location" or "Simulate Driving To Work," be used to input simulated sensor events into the mock-up of the application.

Another such control is an orientation emulator (e.g., orientation emulator 294b of FIG. 2D), which allows the user to simulate data received from a two-dimensional or three-dimensional orientation or directional sensor. The user may interact with a compass control to specify a direction, heading, azimuth, or tilt. For example, using the orientation emulator, selection above a central position may indicate forward tilt, selection below the central position may indicate backward tilt, and selection to the left or right of the central position may indicate moving the mobile device to the left or the right, respectively. Simpler button controls labeled "Simulate forward tilt," "Simulate backward tilt," or "Simulation Left/Right motion" could be used to simulate generating corresponding sensor events.

A further such control is an accelerometer emulator (e.g., accelerometer emulator 294c of FIG. 2D), which allows the user to simulate data received from an accelerometer. An acceleration window may be used to select forward, backward, or sideways acceleration, depending upon the position of the user activation in relation to the center point. The further from the center point, for example, the faster the resultant acceleration input. Alternatively, the user may position their mouse cursor within an acceleration window, and rapidly move the mouse cursor within the acceleration window to simulate shaking mobile device in the same manner. The user may instead or additionally select a "Shake" button to simulate generating an accelerometer sensor event.

Other types of controls an emulators may also be used, such as controls that allow the user to simulate telephony or text messaging sensor events. In addition to graphical display controls and emulators, in some implementations, physical controls, such as buttons or navigation controls available on a mobile device, may be displayed as part of the mock-up in a preview pane. For example, the user could verify functionality when selecting characters on a keypad of a mobile device or when triggering a call button.

In some implementations, a control may be displayed for simulating a sensor event only after determining that the particular device on which the visual programming interface is being displayed does not include a sensor that is capable of generating the sensor event. For instance, while many desktop computers may not include telephony functionality, a control for allowing a user to simulate making or receiving a telephone call would not be displayed in the visual programming interface if the particular desktop computer on which the visual programming interface is displayed includes a telephony module or sensor. Alternatively, if the particular desktop computer includes such a sensor, selection of a control for simulating a sensor events may result in actual sensor events being input to the mock-up of the application The effect that the sensor events have on a mobile device application is simulated (604). Simulating the effect of the sensor event may include advancing the mobile device application that is under development in the visual programming IDE to a state in which the sensor events are assumed to have been input, i.e., a state in which the test for determining whether the sensor event has input is bypassed.

The advanced state may be a state in which the mobile device application assumes the mobile device to have been shaken, to have made or received any (or particular) telephone calls, to be oriented in a particular direction, to have sent or received any (or particular) text messages, or to be located in a particular location. The advanced state may also be a state in which the mobile device assumes that two or more sensor events have been input simultaneously, or near in time to each other.

A mock-up of the mobile device application in the advanced state is output through the visual programming interface (605), thereby ending the process 600. Example mock-ups of a mobile device application are shown, for example, in FIGS. 2A to 2D. A preview pane may provide the user with a mock-up of a mobile device application recently designed by the user. The user may interact with the mock-up version to verify functionality or to debug any problems. In some implementations, the mock-up version may be generated using a different binary executable than the application which would be installed upon a mobile device.

In addition to graphical display controls and the emulators 294, in some implementations, physical controls, such as buttons or navigation controls available on a mobile device, may be displayed as part of the mock-up in the preview pane 292 (not illustrated). For example, the user could verify functionality when selecting characters on a keypad of a mobile device or when triggering a call button.

While several example types of sensor events have been described with reference to FIG. 6, other types of sensor events may be simulated as well. For example, sensors that are specific to mobile devices may provide functionalities such as bar code reading functionality, ringer functionality, position determination functionality, embedded module functionality, proximity sensor functionality, light detection functionality, orientation sensing functionality, camera functionality, personal information management functionality, or social networking functionality. These functionalities may be simulated through code substituted or added into a binary executable version generated to execute within a visual programming IDE. The simulation may include one or more input boxes or user controls for providing inputs typically received externally from a mobile device or through sensor data.

Another type of sensor event that may be simulated is sensor noise, specifically very small, random changes in sensor data that are typically associated with mobile devices in natural use or rest positions. For example, in the real world, an accelerometer on a mobile device will rarely ever return "zero" acceleration in the X and Y directions, or "1 g" in the Z direction, given the normal motions or physiologic tremors of mobile device users. The selection of a "simulate sensor noise" control may therefore advance a mobile device application to a state in which sensor noise is assumed to have been input, allowing the user to determine whether the sensor noise poses unintended consequences to the mobile device application. A user may notice, for example, that physiologic tremors might cause an application to assume that a mobile device has been vigorously shaken, and may adjust settings or thresholds to ensure that a later version of the application does not suffer from problems associated with this incorrect assumption.

Figure 7A:
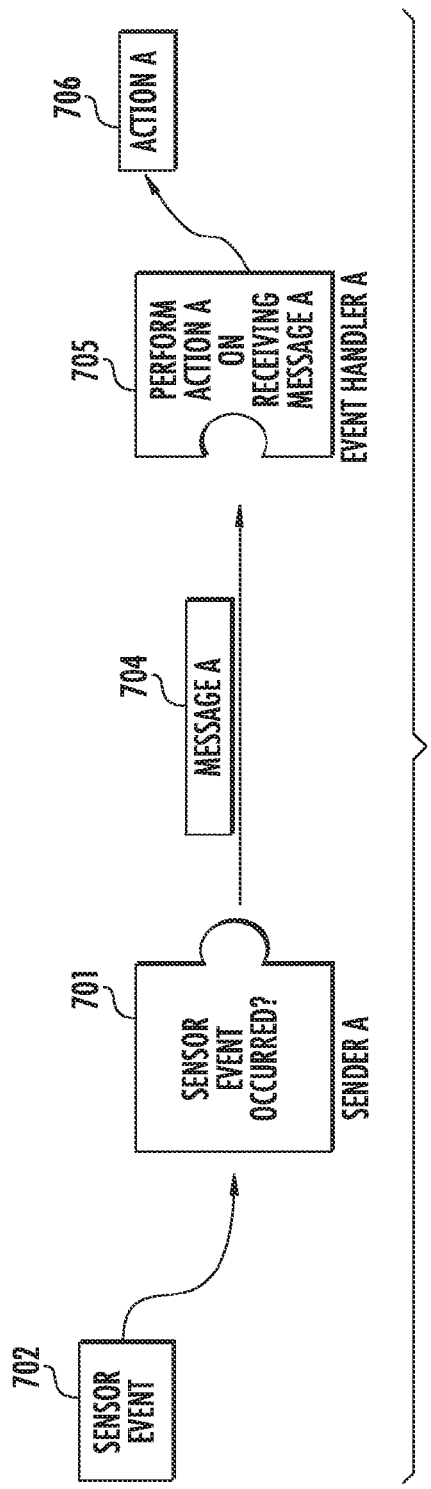
FIGS. 7A to 7C illustrate the simulation of sensor events, according to one exemplary implementation.
Figure 7B:
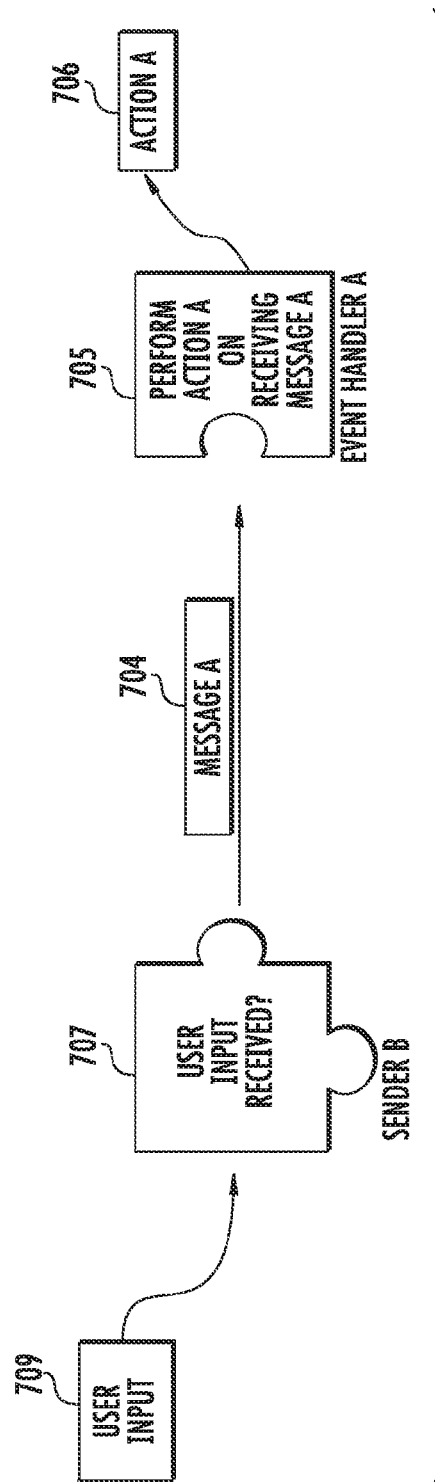
Figure 7C:
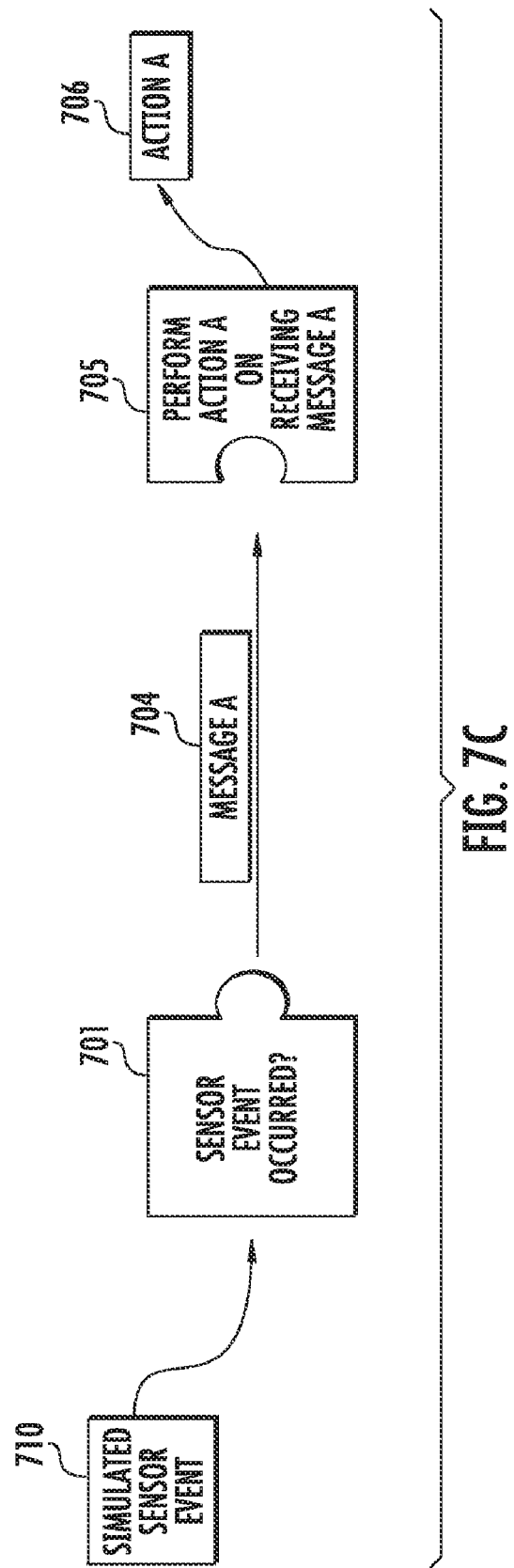

FIGS. 7A to 7C illustrate the simulation of sensor events, according to one exemplary implementation. The mobile device application that is under development in the visual programming IDE may be programmed using event-based programming, in which the flow of the application is controlled by a series of message-triggered events. For instance, as shown in FIG. 7A, a sender 701 receives sensor events 702 from various sensors or, where the sensor 701 is a sensor, the sender generates the sensor events 702.

The sender 701 may performs various test on the sensor events 702, such as to determine whether a sensor event 702 has been received, or by determining whether one or more values associated with the sensor event 702 are considered to be satisfactory or sufficient (e.g., greater than or less than a predetermined threshold). A sensor event 702 may be considered to be satisfactory by comparing raw accelerometer readings to various thresholds to determine, for example, that the mobile device is being vigorously shaken, whether it is remaining relatively motionless, or whether it is accelerating in a single direction or traveling at a relatively constant speed. Depending on the results of the tests, the sender 701 transmits a message 704 to an event handler 705, which may perform an action 706 based on receiving the message 704.

If the mobile device application is being developed on a client device that is incapable of predictably or reliably receiving or generating the sensor event 702, the sender 701 may never be triggered to transmit the message 704 to the event handler 705, and thus the action 706 may never occur. If the user does not have the ability to cause the application to perform the action 706 on demand, portions of the application may go untested, possibly resulting in buggy application code. Similarly, requiring the user to load the application on a mobile device and to manually reproduce a range of sensor inputs in order to test the full functionality of a mobile device application may be onerous and time consuming.

In FIG. 7B, the sensor events are simulated by replacing the sender 701 with a sender 707. While sender 701 monitors and performs tests on sensor event 702, the sender 707 may simply wait for the user to interact with a particular control. When the user selects the particular control, the sender 707 may transmit the same message 704 as the sender 701, causing the event handler 705 to perform the action 706.

Thus, the event handler 705 performs the same action 706 regardless of whether the sender 701 transmits the message 704 based on the sensor event 702 or whether the sender 707 transmits the message 704 based on the user input 709. In this regard, the tests performed on the sensor event 702 by the sender 701 have been bypassed by replacing the sender 701 with the sender 707. From the perspective of the event handler 705, the receipt of the message 704 places the mobile application in a state in which the sensor event 702 has assumedly been input. This is true even though the message 704 may have been transmitted based upon the occurrence of another type of event, specifically the detection of the user input 709 by the sender 707.

In FIG. 7C, instead of replacing the sender 701 with the sender 707, the sensor events are simulated by inputting a simulated sensor event 710 into the sender 701. For instance, upon detecting that the user has selected a "simulate shaking" control on the visual programming interface, stored, or 'canned' accelerometer data that has been captured by another mobile device while the other mobile device was being shaken may be input to the sender 701. After testing the simulated sensor event 710 for sufficiency, the sender 701 will determine that the mobile device is being shaken and will transmit the message 704 to the event handler 705, causing the event handler 705 to perform the action 706.

While this specification contains many specifics, these should not be construed as limitations on the scope of the disclosure or of what may be claimed, but rather as descriptions of features specific to particular implementations. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A system comprising:
one or more computers; and
a data storage device coupled to the one or more computers having instructions stored thereon which, when executed by the one or more computers, cause the one or more computers to perform operations comprising:
altering code of a mobile device application that is under development in a visual programming integrated development environment, to replace a portion of the code which triggers an occurrence of an event based on a receipt of sensor data, with a different portion of code which triggers the occurrence of the event based on a receipt of a user input entered through a visual programming interface of the visual programming integrated development environment;
receiving the user input entered through the visual programming interface of the visual programming integrated development environment,
invoking the different portion of code, thereby advancing the mobile device application that is under development in the visual programming integrated development environment to a state in which the sensor data is assumed to have been received, and
outputting a mock-up of the mobile device application in the advanced state, through the visual programming interface.

2. The system of claim 1, wherein the visual programming interface is displayed on a client device that does not include a sensor which is capable of actually generating the sensor data.

3. The system of claim 1, wherein the mock-up of the mobile device application is displayed in a preview pane of the visual programming interface.

4. The system of claim 1, wherein:
the mobile device application is advanced to a state in which a mobile device upon which the mobile device application is being invoked is assumed to have been shaken.

5. The system of claim 1, wherein:
the mobile device application is advanced to a state in which a mobile device upon which the mobile device application is being invoked is assumed to have made or received a telephone call, or to have made or received a particular telephone call.

6. The system of claim 1, wherein:
the mobile device application is advanced to a state in which a mobile device upon which the mobile device application is being invoked is assumed to be oriented in a particular direction.

7. The system of claim 1, wherein:
the mobile device application is advanced to a state in which a mobile device upon which the mobile device application is being invoked is assumed to have sent or received a text message, or to have sent or received a particular text message.

8. The system of claim 1, wherein:
the mobile device application is advanced to a state in which a mobile device upon which the mobile device application is being invoked is assumed to be located in a particular location.

9. The system of claim 8, wherein receiving a user input further comprises:
receiving a user selection of a point on a map displayed on the visual programming interface.

10. The system of claim 1, wherein:
the mobile device application is advanced to a state in which the event having a user-specified particular type and a user-specified magnitude is assumed to have been received.

11. The system of claim 1, wherein the visual programming integrated development environment comprises a server-based visual programming integrated development environment.

12. The system of claim 1, wherein:
the mobile device application is advanced to a state in which two or more sensor data is assumed to have been simultaneously received from two or more different sensors.

13. A computer-implemented method comprising:
altering, at one or more computers, code of a mobile device application that is under development in a visual programming integrated development environment, to replace a portion of the code which triggers an occurrence of an event based on a receipt of sensor data, with a different portion of code which triggers the occurrence of the event based on a receipt of a user input entered through a visual programming interface of the visual programming integrated development environment;
receiving, at the one or more computers, the user input entered through the visual programming interface of the visual programming integrated development environment;
invoking, at the one or more computers, the different portion of code, thereby advancing the mobile device application that is under development in the visual programming integrated development environment to a state in which the sensor data is assumed to have been received; and
outputting a mock-up of the mobile device application in the advanced state, through the visual programming interface.

14. A data storage device encoded with a computer program, the program comprising instructions that when executed by one or more computers cause the one or more computers to perform operations comprising:
altering code of a mobile device application that is under development in a visual programming integrated development environment, to replace a portion of the code which triggers an occurrence of an event based on a receipt of sensor data, with a different portion of code which triggers the occurrence of the event based on a receipt of a user input entered through a visual programming interface of the visual programming integrated development environment;
receiving the user input entered through the visual programming interface of the visual programming integrated development environment;
invoking the different portion of code, thereby advancing the mobile device application that is under development in the visual programming integrated development environment to a state in which the sensor data is assumed to have been received; and
outputting a mock-up of the mobile device application in the advanced state, through the visual programming interface.

15. The data storage device of claim 14, wherein the visual programming interface is displayed on a client device that does not include a sensor which is capable of actually generating the sensor data.

16. The data storage device of claim 14, wherein the mock-up of the mobile device application is displayed in a preview pane of the visual programming interface.

* * * * *

UNITED STATES PATENT AND TRADEMARK OFFICE
CERTIFICATE OF CORRECTION

| | |
|---|---|
| PATENT NO. | : 8,239,840 B1 |
| APPLICATION NO. | : 13/249413 |
| DATED | : August 7, 2012 |
| INVENTOR(S) | : Herbert Czymontek |

It is certified that error appears in the above-identified patent and that said Letters Patent is hereby corrected as shown below:

Title Page 2, Item (56); "Other Publication", Col. 1, Line 1; "Dreamweaver C55" should read "Dreamweaver CS5".

Signed and Sealed this

Twenty-third Day of October, 2012

David J. Kappos
*Director of the United States Patent and Trademark Office*